(12) United States Patent
Yamada

(10) Patent No.: US 7,262,978 B2
(45) Date of Patent: Aug. 28, 2007

(54) VOLTAGE CONVERSION APPARATUS, VOLTAGE CONVERSION METHOD, AND COMPUTER-READABLE RECORDING MEDIUM WITH PROGRAM RECORDED THEREON TO ALLOW COMPUTER TO EXECUTE VOLTAGE CONVERSION CONTROL

(75) Inventor: Kenji Yamada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 10/523,145

(22) PCT Filed: Jul. 16, 2003

(86) PCT No.: PCT/JP03/09056

§ 371 (c)(1),
(2), (4) Date: Jan. 21, 2005

(87) PCT Pub. No.: WO2004/017906

PCT Pub. Date: Feb. 26, 2004

(65) Prior Publication Data

US 2005/0254265 A1    Nov. 17, 2005

(30) Foreign Application Priority Data

Aug. 12, 2002   (JP)   ............... 2002-234653

(51) Int. Cl.
H02M 1/12    (2006.01)
G05F 1/00    (2006.01)
G05B 13/02    (2006.01)

(52) U.S. Cl. ............... 363/40; 323/222; 700/37

(58) Field of Classification Search .............. 323/222, 323/266; 363/40, 41, 95, 97, 131, 124; 700/37, 700/54, 41, 31, 32
See application file for complete search history.

(56) References Cited

U.S. PATENT DOCUMENTS 4,969,076 A * 11/1990 Schutten et al. ............. 363/17

(Continued)

FOREIGN PATENT DOCUMENTS

JP    05-233007    9/1993

(Continued)

OTHER PUBLICATIONS

Shouji ABO et al.; The Contents of Conference of Institute of Electrical Engineers; pp. 1-7; w/ abstr.

*Primary Examiner*—Karl Easthom
*Assistant Examiner*—Harry Behm
(74) *Attorney, Agent, or Firm*—Oliff & Berridge, PLC

(57) ABSTRACT

A control device receives an output voltage of a voltage-up converter from a voltage sensor, and calculates a feedback preliminary voltage control value determined by the difference between a voltage control value and the output voltage. The control device corrects the calculated feedback preliminary voltage control value in accordance with the output voltage to calculate a feedback voltage control value where the follow-up property of the output voltage with respect to the voltage control value is equal to a reference property. The control device controls the voltage-up converter using a feedback voltage control value. The voltage-up converter converts a direct current voltage from a DC power supply into the output voltage maintaining the follow-up property of the output voltage with respect to the voltage control value at the reference property.

30 Claims, 23 Drawing Sheets

U.S. PATENT DOCUMENTS

| | | | |
|---|---|---|---|
| 5,373,195 A * | 12/1994 | De Doncker et al. | 307/45 |
| 5,847,952 A * | 12/1998 | Samad | 700/48 |
| 5,867,379 A * | 2/1999 | Maksimovic et al. | 363/89 |
| 5,889,393 A * | 3/1999 | Wrathall | 323/282 |
| 5,949,225 A * | 9/1999 | Sawtell | 323/284 |
| 6,127,793 A * | 10/2000 | Kerner | 318/561 |
| 6,225,794 B1 * | 5/2001 | Criscione et al. | 323/283 |
| 6,411,071 B1 * | 6/2002 | Schultz et al. | 323/284 |
| 6,657,417 B1 * | 12/2003 | Hwang | 323/222 |
| 6,664,769 B1 * | 12/2003 | Haas | 323/207 |
| 6,751,510 B1 * | 6/2004 | Tan et al. | 700/41 |

FOREIGN PATENT DOCUMENTS

| | | |
|---|---|---|
| JP | 08-033375 | 2/1996 |
| JP | 08-083103 | 3/1996 |
| JP | 2001-275364 | 10/2001 |
| JP | 2001-275367 | 10/2001 |
| JP | 2001-275367 A | 10/2001 |
| JP | 2002-084743 | 3/2002 |
| JP | A 2002-153090 | 5/2002 |

* cited by examiner

F I G. 6
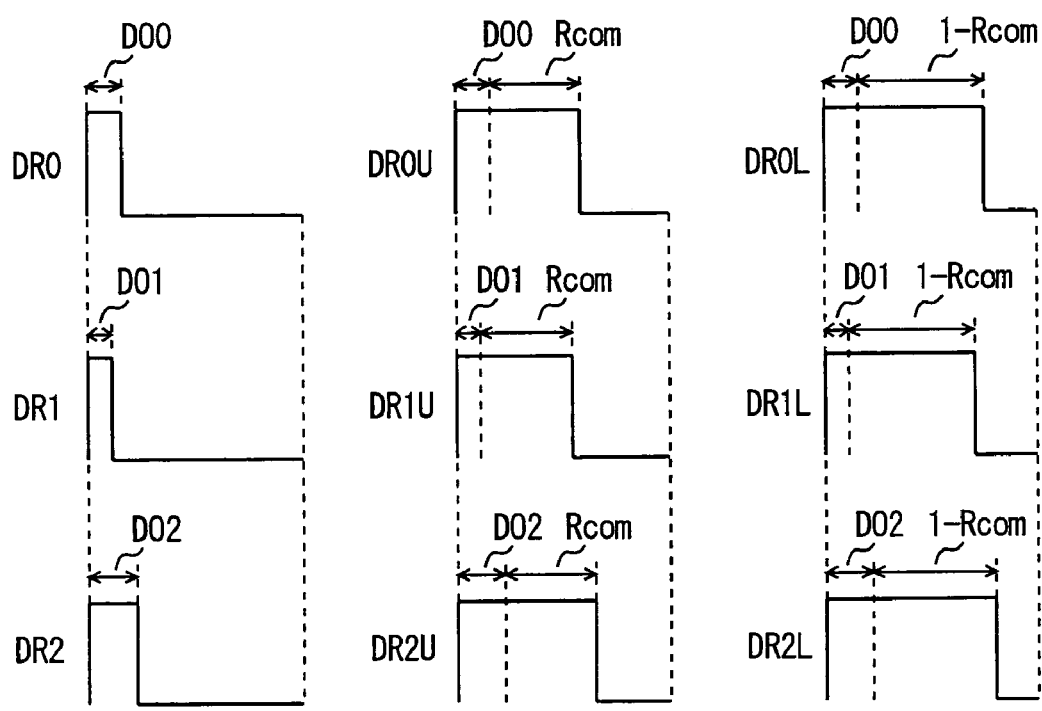

VOLTAGE CONVERSION APPARATUS, VOLTAGE CONVERSION METHOD, AND COMPUTER-READABLE RECORDING MEDIUM WITH PROGRAM RECORDED THEREON TO ALLOW COMPUTER TO EXECUTE VOLTAGE CONVERSION CONTROL

TECHNICAL FIELD

The present invention relates to a voltage conversion apparatus converting a direct current voltage from a DC power supply into a designated voltage, a voltage conversion method of converting a direct current voltage into a designated voltage, and a computer-readable recording medium with a program recorded thereon to allow a computer to execute control of voltage conversion for converting a direct current voltage into a designated voltage.

BACKGROUND ART

Hybrid vehicles and electric vehicles are now attracting considerable attention as automobiles taking into account environmental matters. Some hybrid vehicles are now commercially available.

Such hybrid vehicles employ a DC power supply, an inverter, and a motor driven by the inverter as well as a conventional engine, as the power source. Specifically, power is generated by driving the engine, as well as by the rotation of the motor based on converted alternating voltage, achieved by conversion of a direct current voltage from a DC power supply by means of an inverter. An electric vehicle employs a DC power supply, an inverter, and a motor driven by the inverter as the power source.

In such hybrid vehicles and electric vehicles, an approach is known to boost a direct current voltage from a DC power supply by a voltage-up converter, and supplying the boosted direct current voltage to the inverter that drives the motor (for example, Japanese Patent Laying-Open No. 2001-275367).

Specifically, a hybrid vehicle or an electric vehicle incorporates a motor driver shown in FIG. 23. Referring to FIG. 23, a motor driver 300 includes a DC power supply B, system relays SR1 and SR2, capacitors C1 and C2, a bidirectional converter 310, a voltage sensor 320, and an inverter 330.

DC power supply B outputs a direct current voltage. System relays SR1 and SR2 supply the direct current voltage from DC power supply B to capacitor C1 when turned on by a control device (not shown). Capacitor C1 smoothes the direct current voltage supplied from DC power supply B via system relays SR1 and SR2, and supplies the smoothed direct current voltage to bidirectional converter 310.

Bidirectional converter 310 includes a reactor 311, NPN transistors 312 and 313, and diodes 314 and 315. Reactor 311 has one end connected to a power supply line of DC power supply B and its other end connected at an intermediate point between NPN transistors 312 and NPN transistors 313, i.e. between the emitter of NPN transistor 312 and the collector of NPN transistor 313. NPN transistors 312 and 313 are connected in series between the power supply line and the ground line. The collector of NPN transistor 312 is connected to the power supply line. The emitter of NPN transistor 313 is connected to the ground line. Further, diodes 314 and 315 conducting a current from the emitter side to the collector side are connected between the collectors and emitters of NPN transistors 312 and 313, respectively.

Bidirectional converter 310 has NPN transistors 312 and 313 turned on/off by a control device (not shown) to boost the direct current voltage from capacitor C1 and provide the output voltage to capacitor C2. When the hybrid vehicle or electric vehicle in which motor driver 300 is incorporated is under regenerative braking, bidirectional converters 310 is powered by alternating current motor M1 to down-convert the direct current voltage converted by inverter 330 and supply the down-converted voltage to capacitor C1.

Capacitor C2 smoothes the direct current voltage from bidirectional converter 310 to provide the smoothed direct current voltage to inverter 330. Voltage sensor 320 detects the voltage across capacitor C2, i.e. the output voltage Vm of bidirectional converter 310.

When direct current voltage is supplied from capacitor C2, inverter 330 converts the direct current voltage into alternating voltage under control of a control device (not shown) to drive alternating current motor M1. Accordingly, alternating current motor M1 is driven to generate the torque specified by a torque control value. When the hybrid vehicle or electric vehicle in which motor driver 300 is incorporated is under regenerative braking, inverter 330 converts the alternating voltage generated from alternating current motor M1 into a direct current voltage under control of the control device to supply the converted direct current voltage to bidirectional converter 310 via capacitor C2.

When the direct current voltage output from DC power supply B is boosted and the output voltage Vm is to be provided to inverter 330 in motor driver 300, feedback control is effected so that output voltage Vm detected by voltage sensor 320 is equal to a voltage control value Vdccom. This feedback control is PI control. The PI control gain is determined so that output voltage Vm is equal to voltage control value Vdccom.

In such a conventional motor driver, the PI control gain is determined and feedback control is effected employing the determined PI control gain to set the boosted output voltage Vm equal to voltage control value Vdccom.

When the PI control gain is determined under a certain condition and control is fixed to the determined PI control gain, any change in output voltage Vm and voltage control value Vdccom will cause variation in the adjustment of the voltage applied across NPN transistor 313 in accordance with output voltage Vm even if the difference between output voltage Vm and voltage control value Vdccom is constant. As a result, the problem of variation in the follow-up property of output voltage Vm (e.g., a transient response property) with respect to voltage control value Vdccom will occur.

DISCLOSURE OF THE INVENTION

In view of the foregoing, an object of the present invention is to provide a voltage conversion apparatus converting a direct current voltage into an output voltage such that the follow-up property of the output voltage (e.g., a transient response property) with respect to a designated voltage is constant.

Another object of the present invention is to provide a voltage conversion method of converting a direct current voltage into an output voltage such that the follow-up property of the output voltage with respect to a designated voltage is constant.

The further object of the present invention is to provide a computer-readable recording medium with a program recorded thereon to allow a computer to execute control of voltage conversion converting a direct current voltage into an output voltage such that the follow-up property of the output voltage with respect to a designated voltage is constant.

According to the present invention, a voltage conversion apparatus converts a direct current voltage from a DC power supply into an output voltage such that the output voltage is equal to a designated voltage, and includes a voltage converter, detection means, and control means.

The voltage converter alters the voltage level of the direct current voltage to provide an output voltage. The detection means detects the output voltage from the voltage converter. The control means controls the voltage converter such that the follow-up property of the output voltage to the designated voltage in feedback control matches the reference property, and the output voltage is equal to the designated voltage, based on the detected output voltage and designated voltage.

Preferably, the voltage converter includes a chopper circuit. The control means includes a feedback voltage control value calculation unit, a duty ratio calculation unit, and a switching signal generation unit. The feedback voltage control value calculation unit detects a difference between the output voltage and the designated voltage, determines the control gain in feedback control in accordance with the detected difference, and calculates a feedback voltage control value in feedback control such that the follow-up property is equal to the reference property based on the determined control gain, the output voltage, and the difference. The duty ratio calculation unit calculates the switching duty ratio in the chopper circuit based on the calculated feedback voltage control value. The switching signal generation unit generates a switching signal having a switching duty ratio calculated by the duty ratio calculation unit to provide the generated switching signal to the chopper circuit.

Preferably, the feedback voltage control value calculation unit calculates the feedback designated voltage by correcting the feedback preliminary voltage control value calculated using a control gain such that the follow-up property is equal to the reference property.

Preferably, the feedback voltage control value calculation unit includes a subtracter, a gain determination unit, a computing element, and a corrector.

The subtracter calculates the difference between the output voltage and the designated voltage. The gain determination unit determines the control gain based on the difference. The computing element calculates the feedback preliminary voltage control based on the determined control gain. The corrector corrects the feedback preliminary voltage control by converting the output voltage into the reference voltage where the follow-up property is equal to the reference property and provides a feedback voltage control value.

Preferably, the corrector calculates the ratio of the reference voltage to the output voltage, and corrects the feedback preliminary voltage control value by multiplying the calculated result by the feedback preliminary voltage control value.

Preferably, the feedback voltage control value calculation unit calculates the feedback voltage control value by correcting the difference such that the follow-up property is equal to the reference property.

Preferably, the feedback voltage control value calculation unit includes a subtracter, a corrector, a gain determination unit, and a computing element.

The subtracter calculates the difference between the output voltage and the designated voltage. The corrector corrects the difference such that the follow-up property is equal to the reference property. The gain determination unit determines the control gain based on the difference. The computing element calculates the feedback voltage control value based on the determined control gain and corrected difference.

Preferably, the corrector corrects the difference by converting the output voltage into the reference voltage where the follow-up property is equal to the reference property.

Preferably, the corrector calculates the ratio of the reference voltage to the output voltage, and corrects the difference by multiplying the calculated result by a difference.

Preferably, the voltage converter includes a chopper circuit. The control means includes a feedback voltage control value calculation unit, a duty ratio calculation unit, and a switching signal generation unit.

The feedback voltage control value calculation unit detects the difference between the output voltage and the designated voltage, determines the control gain in feedback control in accordance with the detected difference, and calculates the feedback preliminary voltage control value in feedback control based on the determined control gain, the output voltage, and the difference. The duty ratio calculation unit calculates a switching duty ratio of the chopper circuit such that the follow-up property is equal to the reference property based on the calculated feedback preliminary voltage control value and output voltage. The switching signal generation unit generates a switching signal having a switching duty ratio calculated by the duty ratio calculation unit, and provides the generated switching signal to the chopper circuit.

Preferably, the duty ratio calculation unit calculates the switching duty ratio by correcting the preliminary duty ratio calculated using the feedback preliminary voltage control value such that the follow-up property is equal to the reference property.

Preferably, the duty ratio calculation unit includes a computing element and a corrector.

The computing element calculates a preliminary duty ratio in accordance with the feedback preliminary voltage control value. The corrector corrects the preliminary duty ratio such that the follow-up property is equal to the reference property.

Preferably, the corrector corrects the preliminary duty ratio by converting the output voltage into the reference voltage where the follow-up property is equal to the reference property.

Preferably, the corrector calculates the ratio of the reference voltage to the output voltage, and corrects the preliminary duty ratio by multiplying the calculated result by the preliminary duty ratio.

According to the present invention, a voltage conversion method effects feedback control such that the output voltage is equal to a designated voltage, and converts a direct current voltage from a DC power supply into an output voltage; the method including: a first step of detecting the output voltage; a second step of detecting a difference between a designated voltage and the output voltage; a third step of determining a control gain in accordance with the detected difference; and a fourth step of converting the direct current voltage into an output voltage such that the follow-up property of the output voltage with respect to the designated voltage in feedback control matches the reference property, and the output voltage is equal to the designated voltage, based on the determined control gain, the detected difference and the detected output voltage.

Preferably, the direct current voltage is converted into an output voltage by a chopper circuit. The fourth step includes a first substep of calculating a feedback voltage control value that causes the follow-up property in feedback control to match the reference property based on the control gain, difference, and output voltage, a second substep of calculating a switching duty ratio of the chopper circuit using the feedback voltage control value, and a third substep of controlling the chopper circuit such that the output voltage is equal to the designated voltage, based on the switching duty ratio.

Preferably, the first substep includes the step of calculating a feedback preliminary voltage control value in feedback control based on the control gain and difference, and the step of calculating a feedback voltage control value by correcting the feedback preliminary voltage control value using the output voltage.

Preferably, the step of calculating a feedback voltage control value includes the step of calculating a conversion ratio for conversion of the output voltage into a reference voltage where the follow-up property is equal to the reference property, and the step of multiplying the feedback preliminary voltage control value by the conversion ratio to calculate a feedback voltage control value.

Preferably, the first substep includes the step of calculating a correction difference where the follow-up property is equal to the reference property by correcting the difference using the output voltage, and the step of calculating the feedback voltage control value based on the control gain and the correction difference.

Preferably, the step of calculating a correction difference includes the step of calculating a conversion ratio for conversion of the output voltage into a reference voltage where the follow-up property is equal to the reference property, and the step of multiplying the difference by the conversion ratio to calculate a correction difference.

Preferably, the direct current voltage is converted into the output voltage by a chopper circuit. The fourth step includes a first substep of calculating a feedback preliminary voltage control value in feedback control based on the control gain and difference, a second substep of calculating a preliminary switching duty ratio of the chopper circuit based on the feedback preliminary voltage control value, a third substep of calculating a switching duty ratio where the follow-up property is equal to the reference property by correcting the preliminary switching duty ratio using the output voltage, and a fourth substep of controlling the chopper circuit such that the output voltage is equal to the designated voltage based on the switching duty ratio.

Preferably, the third substep includes the step of calculating the conversion ratio required for conversion of the output voltage into a reference voltage where the follow-up property is equal to the reference property, and the step of multiplying the preliminary switching duty ratio by the conversion ratio to calculate a switching duty ratio.

In accordance with the present invention, a computer-readable recording medium with a program recorded thereon to allow a computer to execute voltage conversion control of effecting feedback control such that an output voltage is equal to a designated voltage, and converting a direct current voltage from a DC power supply into an output voltage; causes a computer to execute: a first step of detecting the output voltage; a second step of detecting a difference between a designated voltage and the output voltage; a third step of determining a control gain in accordance with the detected difference; and a fourth step of converting the direct current voltage into an output voltage such that the follow-up property of the output voltage with respect to the designated voltage in feedback control matches the reference property, and the output voltage is equal to the designated voltage, based on the determined control gain, the detected difference and the detected output voltage.

Preferably, the direct current voltage is converted into an output voltage by a chopper circuit. In the program recorded on a computer-readable recording medium, the fourth step includes a first substep of calculating a feedback voltage control value that causes the follow-up property in feedback control to match the reference property based on the control gain, difference, and output voltage, a second substep of calculating a switching duty ratio of the chopper circuit using the feedback voltage control value, and a third substep of controlling the chopper circuit such that the output voltage is equal to the designated voltage based on the switching duty ratio.

Preferably in the program recorded on a computer-readable recording medium, the first substep includes the step of calculating a feedback preliminary voltage control value in feedback control based on the control gain and difference, and the step of calculating a feedback voltage control value by correcting the feedback preliminary voltage control value using the output voltage.

Preferably in the program recorded on a computer-readable recording medium, the step of calculating a feedback voltage control value includes the step of calculating a conversion ratio required for conversion of the output voltage into a reference voltage where the follow-up property is equal to the reference property, and the step of multiplying the feedback preliminary voltage control value by the conversion ratio to calculate a feedback voltage control value.

Preferably in the program recorded on a computer-readable recording medium, the first substep includes the step of calculating a correction difference where the follow-up property is equal to the reference property by correcting the difference using the output voltage, and the step of calculating the feedback voltage control value based on the control gain and the correction difference.

Preferably in the program recorded on a computer-readable recording medium, the step of calculating a correction difference includes the step of calculating a conversion ratio for conversion of the output voltage into a reference voltage where the follow-up property is equal to the reference property, and the step of multiplying the difference by the conversion ratio to calculate a correction difference.

Preferably, the direct current voltage is converted into the output voltage by a chopper circuit. In the program recorded on a computer-readable recording medium, the fourth step includes a first substep of calculating a feedback preliminary voltage control value in feedback control based on the control gain and difference, a second substep of calculating a preliminary switching duty ratio of the chopper circuit based on the feedback preliminary voltage control value, a third substep of calculating a switching duty ratio where the follow-up property is equal to the reference property by correcting the preliminary switching duty ratio using the output voltage, and a fourth substep of controlling the chopper circuit such that the output voltage is equal to the designated voltage based on the switching duty ratio.

Preferably in the program recorded on a computer-readable recording medium, the third substep includes the step of calculating the conversion ratio required for conversion of the output voltage into a reference voltage where the follow-up property is equal to the reference property, and the step of multiplying the preliminary switching duty ratio by the conversion ratio to calculate a switching duty ratio.

In accordance with the present invention, the direct current voltage from a DC power supply can be converted into the output voltage with the follow-up property of the output voltage to the designated voltage in feedback control kept constant.

BRIEF DESCRIPTION OF THE DRAWINGS

FIG. 6 is a diagram to describe the duty ratio generated by a duty ratio calculation unit in FIG. 4.

BEST MODES FOR CARRYING OUT THE INVENTION

Figure 1:
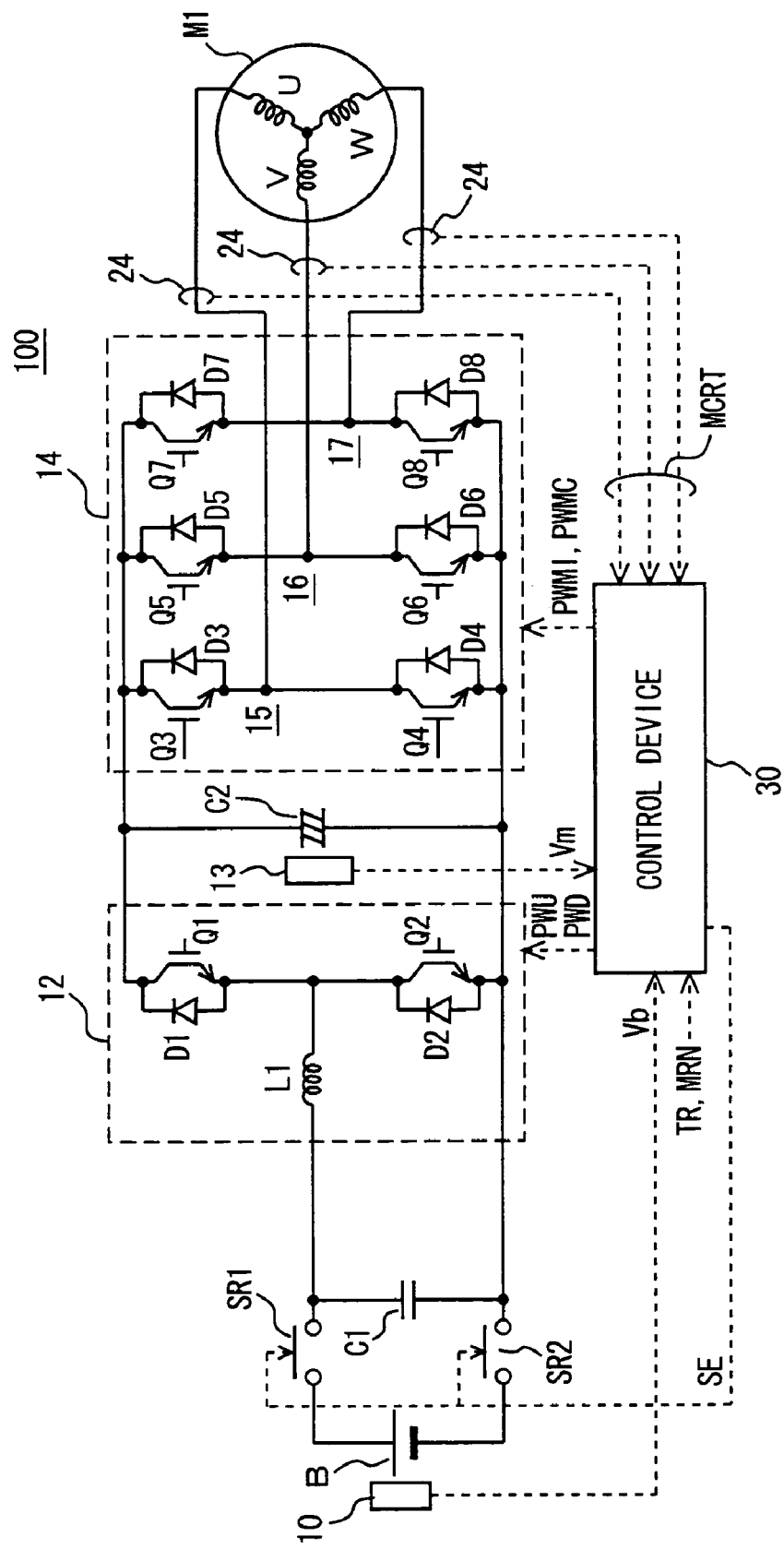
FIG. 1 is a schematic block diagram of a motor driver including a voltage conversion apparatus according to a first embodiment.

Embodiments of the present invention will be described in detail hereinafter with reference to the drawings. In the drawings, the same or corresponding components have the same reference characters allotted, and the description thereof will not be repeated.

FIRST EMBODIMENT

Referring to FIG. 1, a motor driver 100 including a voltage conversion apparatus according to a first embodiment of the present invention includes a DC power supply B, voltage sensors 10 and 13, system relays SR1 and SR2, capacitors C1 and C2, a voltage-up converter 12, an inverter 14, a current sensor 24, and a control device 30.

An alternating current motor M1 is a drive motor to generate torque to drive the driving wheel of a hybrid vehicle or electric vehicle. Alternatively, the motor may be incorporated in a hybrid vehicle with the capability of a generator driven by an engine, and operating as a motor for the engine to allow, for example, engine starting.

Voltage-up converter 12 includes a reactor L1, NPN transistors Q1 and Q2, and diodes D1 and D2. Reactor L1 has one end connected to a power supply line of DC power supply B, and its other end connected at an intermediate point of NPN transistor Q1 and NPN transistor Q2, i.e., between the emitter of NPN transistor Q1 and the collector of NPN transistor Q2. NPN transistors Q1 and Q2 are connected in series between a power supply line and a ground line. NPN transistor Q1 has its collector connected to the power supply line, whereas NPN transistor Q2 has its emitter connected to the ground line. Diodes D1 and D2 flowing current from the emitter side to the collector side are connected between the collectors and emitters of NPN transistors Q1 and Q2, respectively.

Inverter 14 includes a U-phase arm 15, a V-phase arm 16, and a W-phase arm 17. U-phase arm 15, V-phase arm 16, and W-phase arm 17 are connected in parallel between the power supply line and the ground line.

U-phase arm 15 is constituted of NPN transistors Q3 and Q4 connected in series. V-phase arm 16 is constituted of NPN transistors Q5 and Q6 connected in series. W-phase arm 17 is constituted of NPN transistors Q7 and Q8 connected in series. Diodes D3-D8 are connected between respective collectors and emitters of NPN transistors Q3-Q8, respectively, to allow a current flow from the emitter side to the collector side.

Each of the phase arms has an intermediate point connected to respective ends of phase coils of alternating current motor M1. Specifically, alternating current motor M1 is a three-phase permanent magnet motor with respective one ends of the three coils of the U, V, and W-phase connected in common at the center. The other end of the U-phase coil is connected to the intermediate point between NPN transistors Q3 and Q4. The other end of the V-phase coil is connected to the intermediate point between NPN transistors Q5 and Q6. The other end of the W-phase coil is connected to the intermediate point between NPN transistors Q7 and Q8.

DC power supply B is formed of a nickel-hydrogen or lithium-ion secondary battery. Voltage sensor 10 detects a direct current voltage Vb from DC power supply B to output the detected voltage Vb to control device 30. System relays SR1 and SR2 are turned on by a signal SE from control device 30. Capacitor C1 smoothes a DC voltage supplied from DC power supply B to provide the smoothed DC voltage to voltage-up converter 12.

Voltage-up converter 12 boosts the DC voltage from capacitor C1 to supply the boosted voltage to-capacitor C2. More specifically, voltage-up converter 12 receives a signal PWU from control device 30 to boost and supply to capacitor C2 the DC voltage in response to a period in which NPN transistor Q2 is turned on by signal PWU.

Further, voltage-up converter 12 receives a signal PWD from control device 30 to down-convert a DC voltage supplied from inverter 14 via capacitor C2, whereby DC power supply B is charged. It is to be noted that a circuit configuration in which only the boosting function is effected may be applied.

Capacitor C2 smoothes the DC voltage from voltage-up converter 12 to supply the smoothed DC voltage to inverter 14. Voltage sensor 13 detects the voltage across capacitor C2, i.e., output voltage Vm from voltage-up converter 12 (corresponding to the input voltage to inverter 14; the same applies hereinafter) and provides the detected output voltage Vm to control device 30.

Inverter 14 receives the DC voltage from capacitor C2 to convert the DC voltage into an AC voltage based on a signal PWMI from control device 30, whereby alternating current motor M1 is driven. Then, alternating current motor M1 is driven to generate torque designated by a torque control value TR. In regenerative braking of a hybrid or electric vehicle including motor driver 100, inverter 14 converts an AC voltage generated by alternating current motor M1 into a DC voltage according to a signal PWMC from control device 30 and supplies the converted DC voltage to voltage-up converter 12 via capacitor C2. As used herein, "regenerative braking" includes braking which is caused when a driver of a hybrid or electric vehicle depresses the foot brake and which is accompanied by regenerative power generation as well as deceleration (or stopping of acceleration) of the vehicle by releasing the acceleration pedal in driving without operating the foot brake, which is also accompanied by regenerative power generation.

Current sensor 24 detects a motor current MCRT flowing to alternating current motor M1 to output the detected motor current MCRT to control device 30.

Control device 30 generates a signal PWU required to drive voltage-up converter 12 and a signal PWMI required to drive inverter 14 by a method that will be described afterwards, and provides the generated signals PWU and PWMI to voltage-up converter 12 and inverter 14, respectively, based on a torque control value TR and a motor rotation number MRN applied from an external ECU (Electrical Control Unit), a direct current voltage Vb from voltage sensor 10, an output voltage Vm from voltage sensor 13, and a motor current MCRT from current sensor 24.

Signal PWU is a signal to drive voltage-up converter 12 when voltage-up converter 12 converts the direct current voltage from capacitor C1 into output voltage Vm. Control device 30 effects feedback control of output voltage Vm when voltage-up converter 12 is to convert direct current voltage Vb into output voltage Vm, and generates signal PWU required to drive voltage-up converter 12 such that output voltage Vm is equal to a designated voltage control value Vdccom. The method of generating signal PWU will be described afterwards.

Control device 30 responds to a signal indicating that the hybrid vehicle or electric vehicle attains a regenerative braking mode from the external ECU to generate and provide to inverter 14 a signal PWMC required to convert the alternating voltage generated by alternating current motor M1 into a direct current voltage. At this stage, NPN transistors Q4, Q6 and Q8 of inverter 14 are switched under control of signal PWMC. Specifically, NPN transistors Q6 and Q8 are turned on, NPN transistors Q4 and Q8 are turned on, and NPN transistors Q4 and Q6 are turned on when electric power is generated by the U-phase, the V-phase, and the W-phase, respectively, of alternating current motor M1. Accordingly, inverter 14 converts the alternating voltage generated by alternating current motor M1 into a direct current voltage and supplies the same to voltage-up converter 12.

Further, control device 30 also responds to a signal indicating that the hybrid vehicle or electric vehicle has entered a regenerative braking mode from the external ECU to generate signal PWD required to down-convert the direct current voltage supplied from inverter 14, and provides the generated signal PWD to voltage-up converter 12. Accordingly, the alternating voltage generated by alternating current motor M1 is converted into a direct current voltage, and then down-converted to be supplied to DC power supply B.

Control device 30 also generates signal SE required to turn on system relays SR1 and SR2, and provides the generated signal SE to system relays SR1 and SR2.

Figure 2:
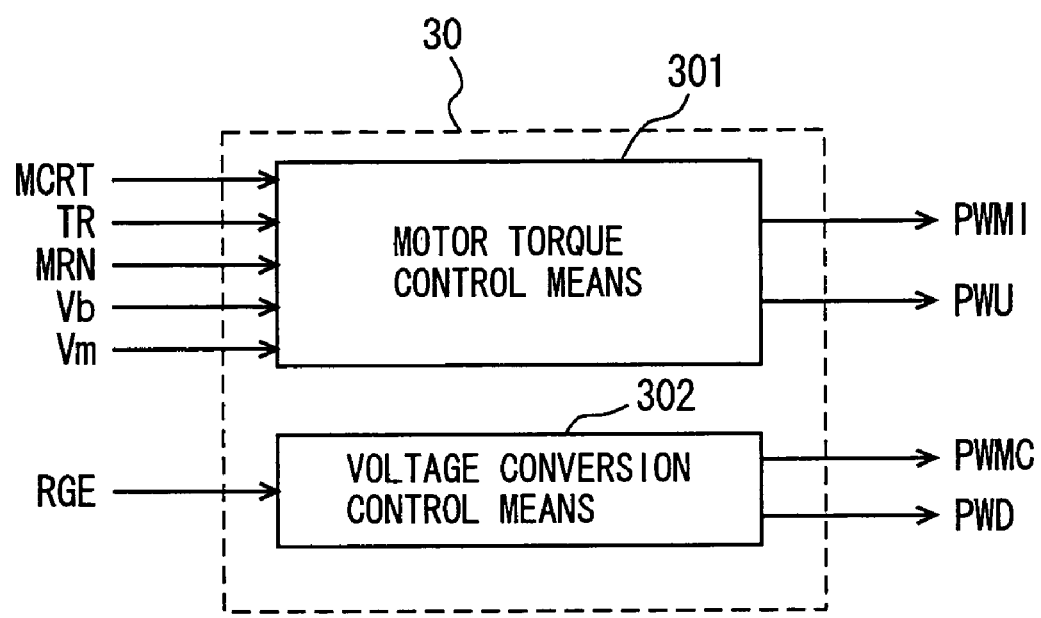
FIG. 2 is a functional block diagram of a control device in FIG. 1.

FIG. 2 is a functional block diagram of control device 30. Referring to FIG. 2, control device 30 includes a motor torque control means 301, and a voltage conversion control means 302. Motor torque control means 301 generates, during driving of alternating current motor M1, signal PWU-required to turn on/off NPN transistors Q1 and Q2 of voltage-up converter 12 by a method as will be described afterwards, and signal PMWI required to turn on/off NPN transistors Q3-Q8 of inverter 14, and provides the generated signals PWU and PWMI to voltage-up converter 12 and inverter 14, respectively, based on a torque control value TR (the degree of depressing the acceleration peddle of a vehicle; torque control value to be applied to the motor is calculated taking into account the operational status of the engine in a hybrid vehicle), direct current voltage Vb from DC power supply B, motor current MCRT, motor rotation number MRN, and output voltage Vm of voltage-up converter 12.

When in a regenerative braking mode, voltage conversion control means 302 receives a signal RGE indicating that the hybrid vehicle or electric vehicle has entered a regenerative braking mode from the external ECU to generate and provide to inverter 14 a signal PWMC required to convert the alternating voltage generated by alternating current motor M1 into a direct current voltage.

Voltage conversion generation means 302 also generates and provides to voltage-up converter 12 a signal PWD required to down-convert the direct current voltage supplied from inverter 14 in response to reception of signal RGE from the external ECU in a regenerative braking mode. As such, voltage-up converter 12 has the capability of a bidirectional converter since the direct current voltage can be down-convert by a signal PWD directed thereto.

Figure 3:
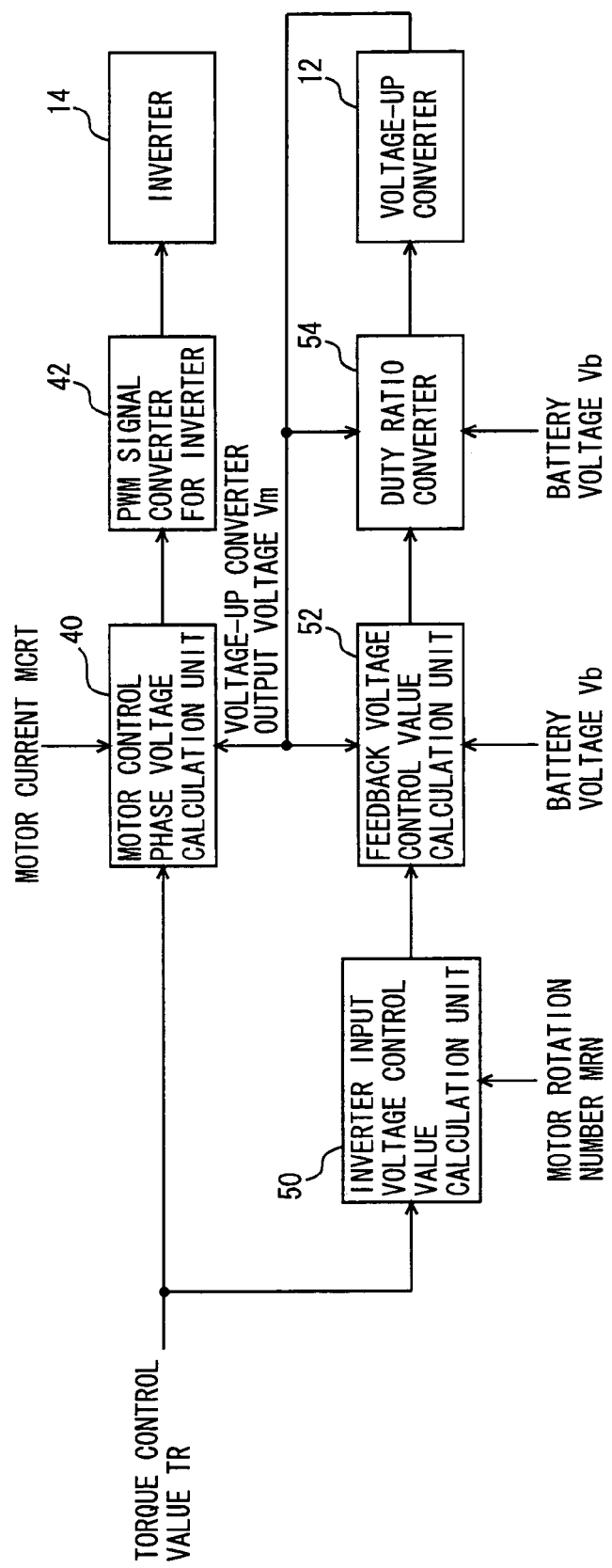
FIG. 3 is a functional block diagram to describe the function of a motor torque control means in FIG. 2.

FIG. 3 is a functional block diagram of motor torque control means 301. Referring to FIG. 3, motor torque control means 301 includes a motor control phase voltage calculation unit 40, a PWM signal converter 42 for the inverter, an inverter input voltage control value calculation unit 50, a feedback voltage control value calculation unit 52, and a duty ratio converter 54.

Motor control phase voltage calculation unit 40 receives output voltage Vm of voltage-up converter 12, i.e. the input voltage to inverter 14 from voltage sensor 13, motor current MCRT flowing through each phase of alternating current motor M1 from current sensor 24, and torque control value TR from the external ECU. Motor control phase voltage calculation unit 40 calculates the voltage to be applied to the coil of each phase of alternating current motor M1 based on these input signals to supply the calculated result to PWM signal converter 42.

PWM signal converter 42 actually generates signal PWMI that turns on/off each of NPN transistors Q3-Q8 of inverter 14 in accordance with the calculated result from motor control phase voltage calculation unit 40 to provide the generated signal PWMI to each of NPN transistors Q3-Q8 of inverter 14.

Accordingly, each of NPN transistors Q3-Q8 has its switching controlled, whereby the current to be conducted to each phase of alternating current motor M1 is adjusted such that alternating current motor M1 outputs the designated torque. Thus, motor driving current is controlled so that a motor torque corresponding to torque control value TR is output.

Inverter input voltage control value calculation unit 50 calculates the optimum value (target value) of the inverter input voltage based on torque control value TR and motor rotation number MRN, i.e. calculates voltage control value Vdccom and provides the calculated voltage control value Vdccom to feedback voltage control value calculation unit 52.

Feedback voltage control value calculation unit 52 calculates a feedback voltage control value Vdccom_fb by a method that will be described afterwards based on output voltage Vm of voltage-up converter 12 from voltage sensor 13 and voltage control value Vdccom from inverter input voltage control value calculation unit 50 to provide the calculated feedback voltage control value Vdccom_fb to duty ratio converter 54. Feedback voltage control value calculation unit 52 calculates a compensation ratio Rcom based on voltage control value Vdccom and a battery voltage Vb from voltage sensor 10 to provide the calculated compensation ratio Rcom to duty ratio converter 54.

Compensation ratio Rcom is used to incorporate direct current voltage Vb output from DC power supply into the feedback control of output voltage Vm. Specifically, the duty ratio for turning on/off NPN transistors Q1 and Q2 of voltage-up converter 12 is determined in view of direct current voltage Vb since voltage-up converter 12 is directed to converting direct current voltage Vb into voltage control value Vdccom.

Duty ratio converter 54 calculates a duty ratio for setting output voltage Vm from voltage sensor 13 to feedback voltage control value Vdccom_fb from feedback voltage control value calculation unit 52 based on battery voltage Vb from voltage sensor 10, feedback voltage control value Vdccom_fb from feedback voltage control value calculation unit 52, and compensation ratio Rcom, and generates signal PWU required to turn on/off NPN transistors Q1 and Q2 of voltage-up converter 12 based on the calculated duty ratio. Duty ratio converter 54 provides the generated signal PWU to NPN transistors Q1 and Q2 of voltage-up converter 12.

Since a greater amount of electric power is accumulated by reactor L1 by increasing the on-duty of NPN transistor Q2 located at the lower side of voltage-up converter 12, a higher voltage output can be obtained. In contrast, the voltage of the power supply line is reduced by increasing the on-duty of NPN transistor Q1 located at the upper side. Therefore, by controlling the duty ratio of NPN transistors Q1 and Q2, the voltage of the power supply line can be adjusted to an arbitrary level equal to or greater than the output voltage of DC power supply B.

Figure 4:
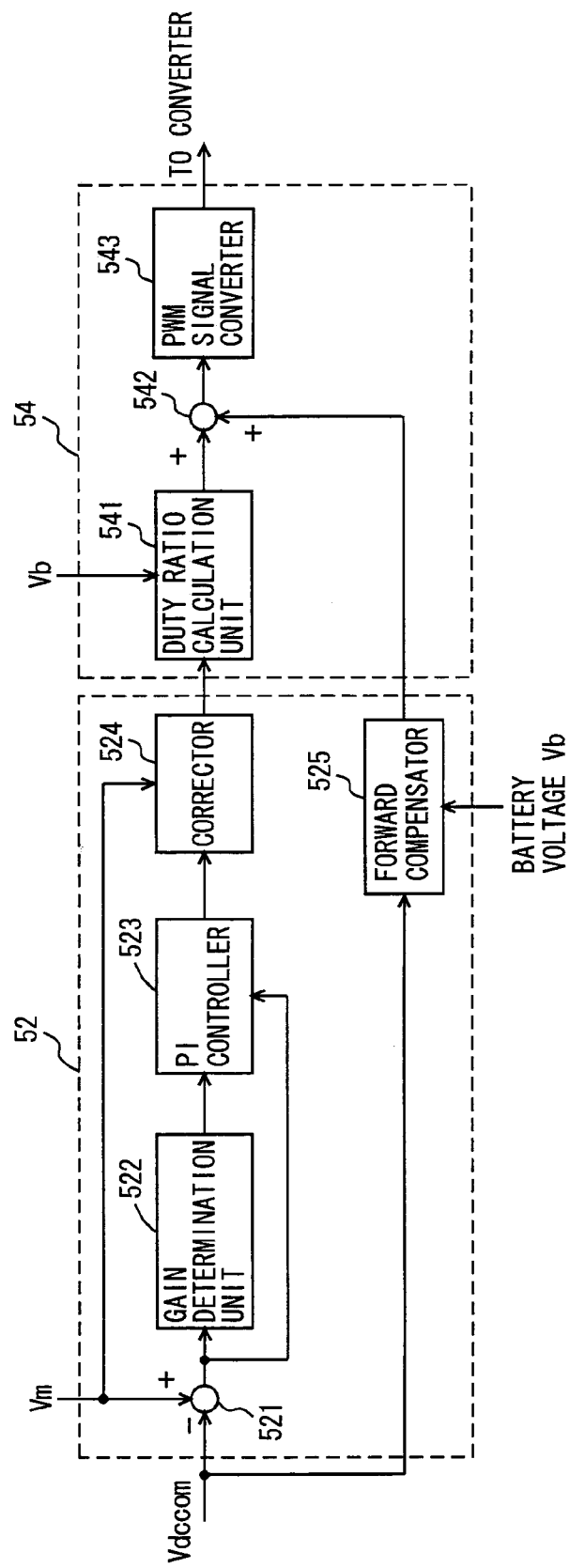
FIG. 4 is a functional block diagram to describe the function of a feedback voltage control value calculation unit and a duty ratio converter in FIG. 3.

Referring to FIG. 4, feedback voltage control value calculation unit 52 includes a subtracter 521, a gain determination unit 522, a PI controller 523, a corrector 524, and a forward compensator 525. Subtracter 521 receives voltage control value Vdccom from inverter input voltage control value calculation unit 50 and output voltage Vm from voltage sensor 13 to subtract voltage control value Vdccom from output voltage Vm. Subtracter 521 provides the subtracted result to gain determination unit 522 and PI controller 523 as a difference $\Delta Vdc$.

Gain determination unit 522 determines a PI control gain in accordance with difference $\Delta Vdc$ from subtracter 521. In other words, gain determination unit 522 determines a proportional gain PG and an integration gain IG in accordance with difference $\Delta Vdc$. Gain determination unit 522 provides the determined PI control gain to PI controller 523.

PI controller 523 calculates a feedback preliminary voltage control value Vdccom_fb_pr based on the PI control gain from gain determination unit 522 and difference $\Delta Vdc$ from subtracter 521. Specifically, PI controller 523 calculates feedback preliminary voltage control value Vdccom_fb_pr by inserting proportional gain PG from gain determination unit 522 and integration gain IG received from gain determination unit 522, and difference $\Delta Vdc$ received from subtracter 521 into the following equation.

$$Vdccom\_fb\_pr = PG \times \Delta Vdc + IG \times \Sigma Vdc \quad (1)$$

Figure 8:
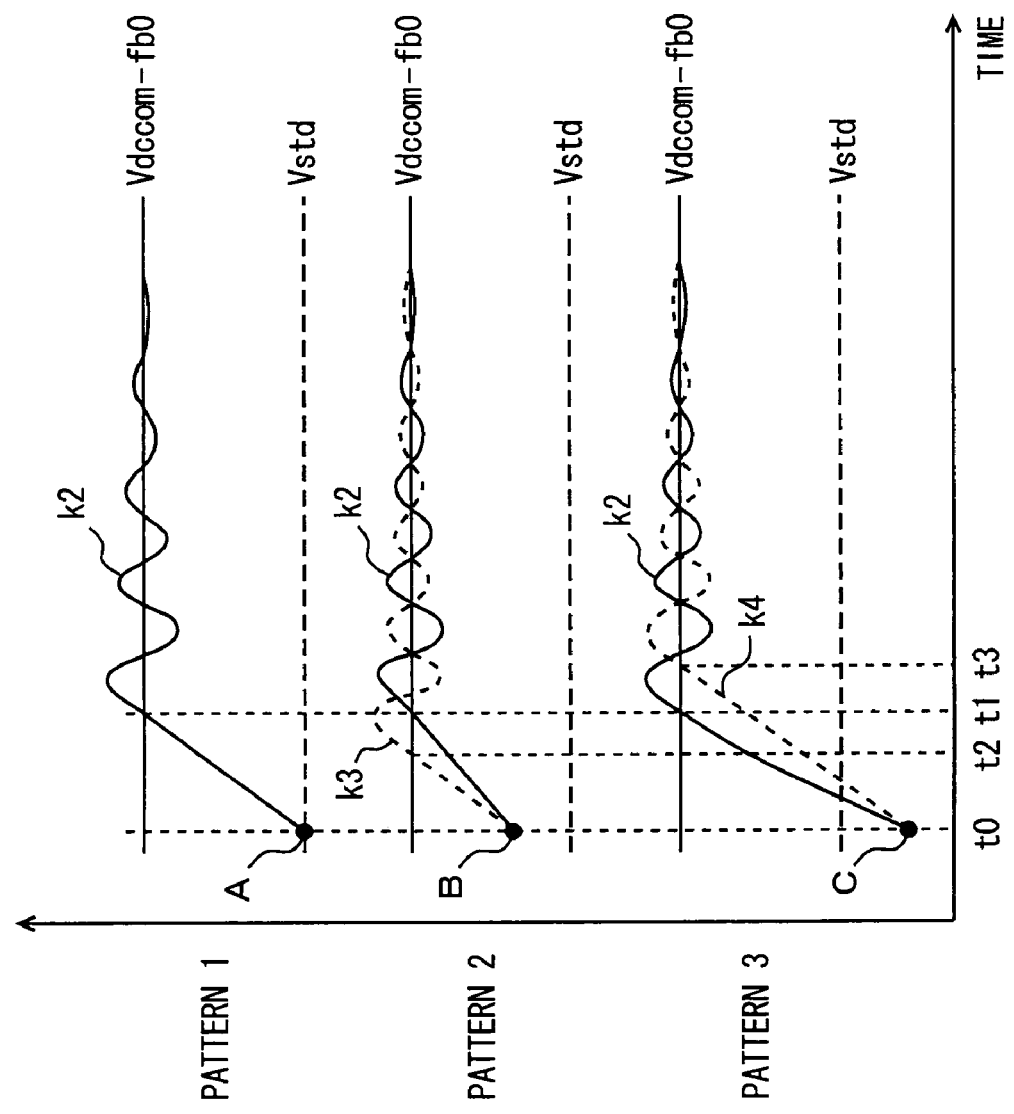
FIG. 8 is a timing chart of a control pattern.

Corrector 524 receives feedback preliminary voltage control value Vdccom_fb_pr from PI controller 523 and output voltage Vm from voltage sensor 13 to correct feedback preliminary voltage control value Vdccom_fb_pr based on the following equation to calculate feedback voltage control value Vdccom_fb.

$$Vdccom\_fb = Vdccom\_fb\_pr \times \frac{Vstd}{Vm} \quad (2)$$

where Vstd represents the reference voltage. Reference voltage Vstd is the output voltage of voltage-up converter 12 where the follow-up property of output voltage Vm (e.g., a transient response property of voltage-up converter 12) with respect to voltage control value Vdccom is equal to the reference property (e.g., a reference transient response property of voltage-up converter 12 as illustrated in FIG. 8, Pattern 1, curve k2).

By dividing reference voltage Vstd by output voltage Vm, corrector 524 calculates the conversion ratio required to convert output voltage Vm into reference voltage Vstd where the follow-up property of output voltage Vm to voltage control value Vdccom is equal to the reference property. Then, corrector 524 multiplies the calculated conversion ratio by feedback preliminary voltage control value Vdccom_fb_pr to calculate feedback voltage control value Vdccom_fb where the follow-up property of output voltage Vm to voltage control value Vdccom is equal to the reference property.

Forward compensator 525 receives voltage control value Vdccom from inverter input voltage control value calculation unit 50 and battery voltage Vb from voltage sensor 10 to calculate compensation ratio Rcom by the following equation.

$$Rcom = \frac{Vb}{Vdccom} \quad (3)$$

Then, forward compensator 525 furthermore calculates a compensation ratio 1−Rcom using compensation ratio Rcom to provide compensation ratio Rcom and compensation ratio 1−Rcom to duty ratio converter 54.

Duty ratio converter 54 includes a duty ratio calculation unit 541, an adder 542, and a PWM signal converter 543. Duty ratio calculation unit 541 calculates a duty ratio required to set output voltage Vm from voltage sensor 13 to feedback voltage control value Vdccom_fb based on battery voltage Vb from voltage sensor 10 and feedback voltage control value Vdccom_fb from corrector 524.

Adder 542 receives the duty ratio from duty ratio calculation unit 541 and the compensation ratios Rcom and 1−Rcom from forward compensator 525 to calculate two compensation duty ratios by adding respective compensation ratios Rcom and 1−Rcom to the duty ratio. Adder 524 provides the two compensation duty ratios to PWM signal converter 543.

PWM signal converter 543 generates signal PWU required to turn on/off NPN transistors Q1 and Q2 of voltage-up converter 12 based on the two compensation duty ratios from adder 542. Specifically, PWM signal converter 543 generates signal PWU that determines the on-duties D1 and D2 of NPN transistors Q1 and Q2 of voltage-up converter 12 by the following equations (4) and (5), where the on-duty output from duty ratio calculation unit 541 is D0.

$$D1 = D0 + Rcom \quad (4)$$

$$D2 = D0 + 1 - Rcom \quad (5)$$

PWM signal conversion unit 543 provides the generated signal PWU to NPN transistors Q1 and Q2 of voltage-up converter 12. NPN transistors Q1 and Q2 of voltage-up converter 12 are turned on/off in response to signal PWU. Accordingly, voltage-up converter 12 converts direct current voltage Vb into output voltage Vm such that output voltage Vm is equal to voltage control value Vdccom. In this case, the follow-up property of output voltage Vm with respect to voltage control value Vdccom matches the reference property.

Thus, motor torque control means 301 of control device 30 receives torque control value TR from the external ECU to effect feedback control of voltage conversion in voltage-up converter 12 converting direct current voltage Vb into output voltage Vm such that output voltage Vm of voltage-up converter 12 is equal to voltage control value Vdccom calculated based on torque control value TR, and controls inverter 14 such that alternating current motor M1 generates the torque of torque control value TR. Accordingly, alternating current motor M1 generates the torque designated by torque control value TR.

As described above, corrector 524 corrects feedback preliminary voltage control value Vdccom_fb_pr output from PI controller 523 based on equation (2). The relationship of equation (2) corresponds to curve k1 in FIG. 5.

Figure 5:
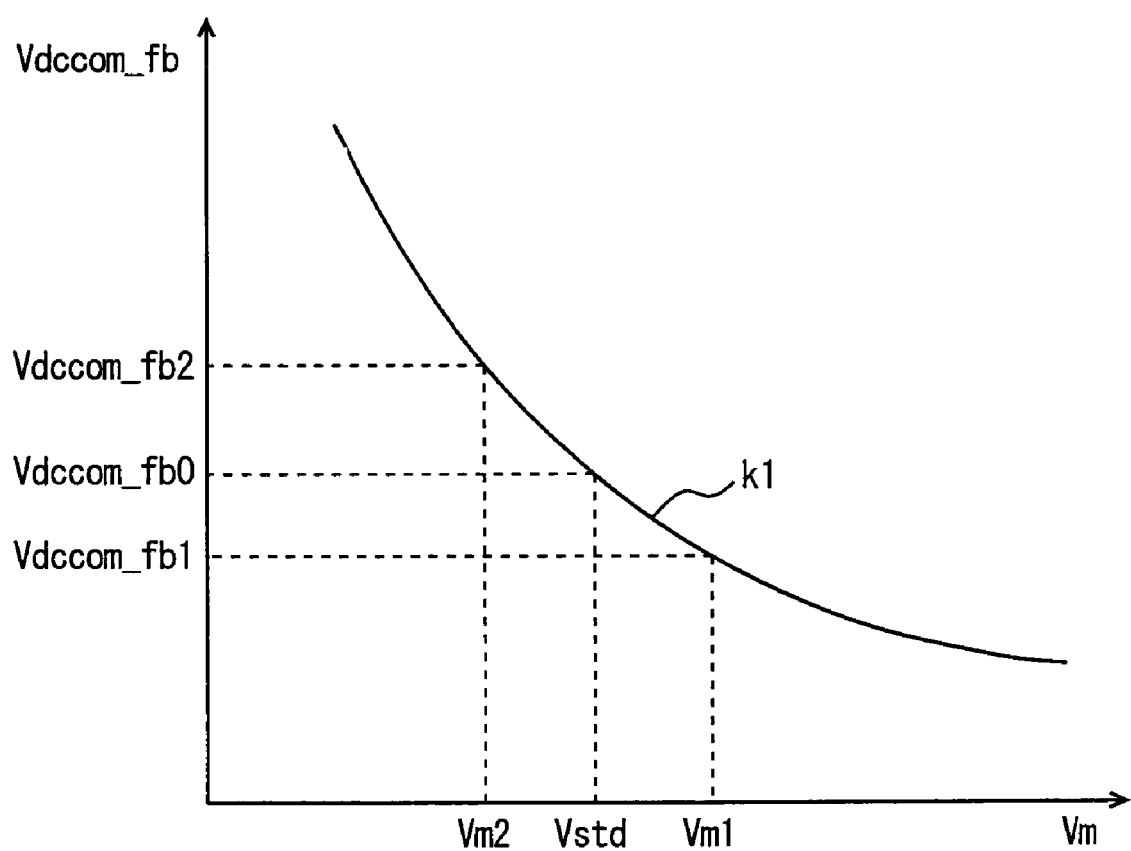
FIG. 5 is a diagram representing the relationship between feedback voltage control and the output voltage of a voltage-up converter.

Referring to FIG. 5, when output voltage Vm of voltage-up converter 12 is equal to reference voltage Vstd, feedback voltage control value Vdccom_fb is equal to feedback voltage control value Vdccom_fb0 (=Vdccom_fb_pr). When output voltage Vm is higher than reference voltage Vstd, feedback voltage control value Vdccom_fb is equal to feedback voltage control value Vdccom_fb1. When output voltage Vm is lower than reference voltage Vstd, feedback voltage control value Vdccom_fb is equal to feedback voltage control value Vdccom_fb2.

Referring to FIG. 6, duty ratio calculation unit 541 calculates a duty ratio DR0 where the on-duty is D00 (<1) based on feedback voltage control value Vdccom_fb0 when output voltage Vm is equal to reference voltage Vstd. When output voltage Vm is higher than reference voltage Vstd, duty ratio calculation unit 541 calculates a duty ratio DR1 where the on-duty is D01 (<D00) based on feedback voltage control value Vdccom_fb1. When output voltage Vm is lower than reference voltage Vstd, duty ratio calculation unit 541 calculates a duty ratio DR2 where the on-duty is D02 (D00<D02<1) based on feedback voltage control value Vdccom_fb2.

When output voltage Vm is equal to reference voltage Vstd, adder 542 adds compensation ratio Rcom to duty ratio DR0 to provide compensation duty ratio DR0U to PWM signal converter 543, and adds compensation ratio 1−Rcom to duty ratio DR0 to provide compensation duty ratio DR0L to PWM signal converter 543.

When output voltage Vm is higher than reference voltage Vstd, adder 542 adds compensation ratio Rcom to duty ratio DR1 to provide compensation duty ratio DR1U to PWM signal converter 543, and adds compensation ratio 1−Rcom to duty ratio DR1 to provide compensation duty ratio DR1L to PWM signal converter 543.

When output voltage Vm is lower than reference voltage Vstd, adder 542 adds compensation ratio Rcom to duty ratio DR2 to provide compensation ratio duty ratio DR2U to PWM signal converter 543, and adds compensation ratio 1−Rcom to duty ratio DR2 to provide compensation ratio duty ration DR2L to PWM signal converter 543.

Figure 7:
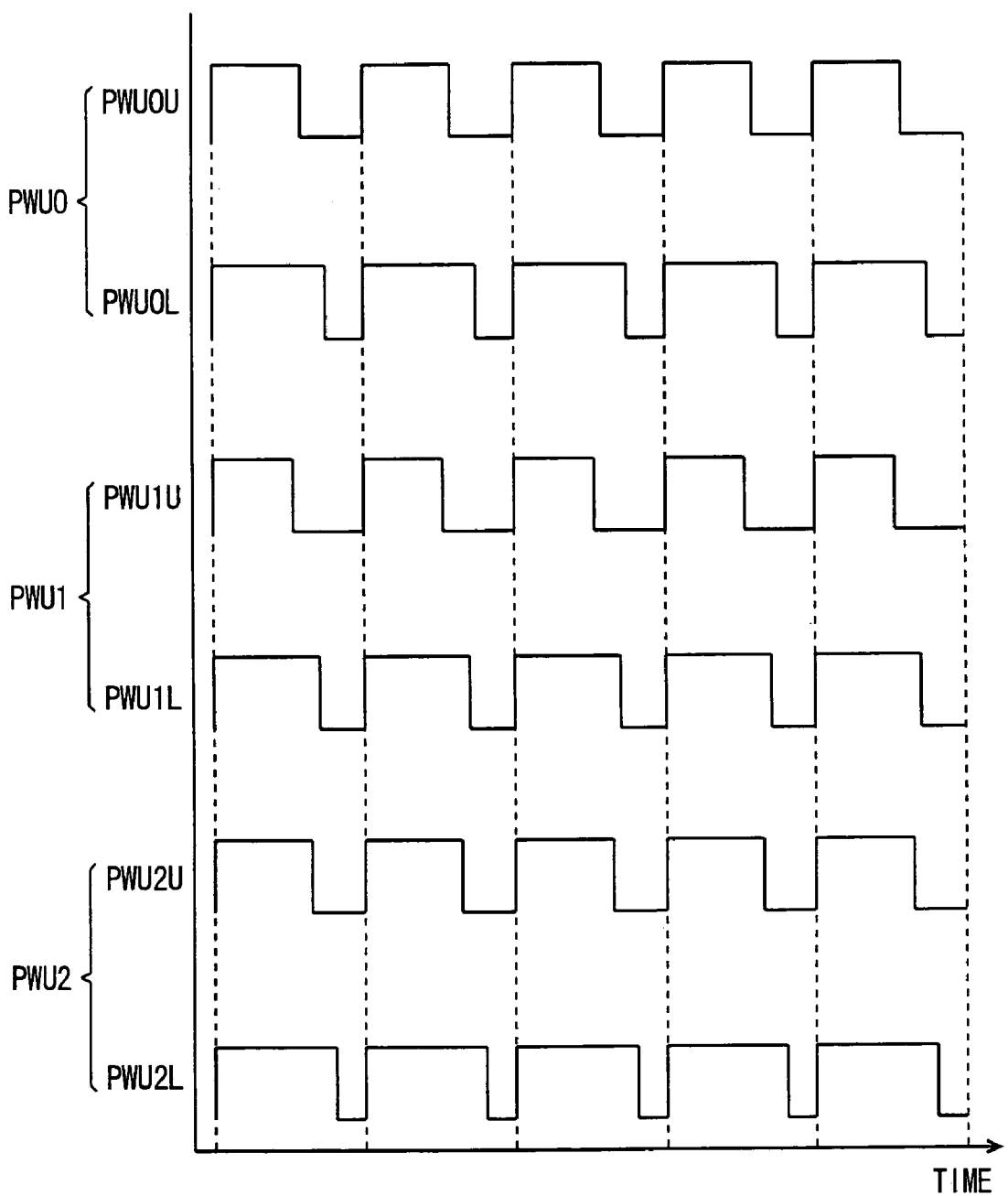
FIG. 7 is a timing chart of a signal generated by a duty ratio converter in FIG. 3.

Referring to FIG. 7, when output voltage Vm is equal to reference voltage Vstd, PWM signal converter 543 generates signals PWU0U and PWU0L based on duty ratios DR0U and DR0L to provide a signal PWU0 constituted of signals PWU0U and PWU0L to voltage-up converter 12. When output voltage Vm is higher than reference voltage Vstd, PWM signal converter 543 generates signals PWU1U and PWU1L based on duty ratios DR1U and DR1L to output a signal PWU1 constituted of signals PWU1U and PWU1L to voltage-up converter 12. When output voltage Vm is lower than reference voltage Vstd, PWM signal converter 543 generates signals PWU2U and PWU2L based on duty ratios DR2U and DR2L to provide a signal PWU2 constituted of signals PWU2U and PWU2L to voltage-up converter 12.

Signals PWU0U, PWU1U and PWU2U are signals for turning on/off NPN transistor Q1 of voltage-up converter 12, whereas PWU0L, PWU1L and PWU2L are signals for turning on/off NPN transistor Q2 of voltage-up converter 12.

FIG. 8 represents the follow-up property of output voltage Vm (e.g., a transient response property of voltage-up converter 12) with respect to feedback voltage control value Vdccom_fb0 in feedback control when NPN transistors Q1 and Q2 of voltage-up converter 12 are turned on/off using signals PWU0, PWU1 and PWU2 shown in FIG. 7.

Referring to FIG. 8, output voltage Vm follows feedback voltage control value Vdccom_fb0 as in pattern 1 when output voltage Vm matches reference voltage Vstd. Specifically, output voltage Vm starts from a point A at timing t0 to cross feedback voltage control value Vdccom_fb0 at timing t1, and then follows feedback voltage control value Vdccom_fb0 in accordance with a curve k2. The follow up property represented by curve k2 is referred to as the "reference property" (e.g., a reference transient response property).

When output voltage Vm is higher than reference voltage Vstd, output voltage Vm follows feedback voltage control value Vdccom_fb0 as in pattern 2. Specifically, output voltage Vm starts from a point B indicating a voltage that is higher than reference voltage Vstd, rises more gentle than in pattern 1 since the on-duty of NPN transistor Q2 (D01+1−Rcom) is smaller than that of pattern 1 (D00+1−Rcom), and crosses feedback voltage control value Vdccom_fb0 at timing t1. Then, output voltage Vm follows feedback voltage control value Vdccom_fb0 in accordance with curve k2 as in pattern 1.

In this context, output voltage Vm follows feedback voltage control value Vdccom_fb0 in accordance with curve k3 when correction of feedback preliminary voltage control value Vdccom_fb_pr is not conducted by corrector 524. Specifically, output voltage Vm rises at the same speed as in pattern 1, and then crosses feedback voltage control value Vdccom_fb0 at a timing t2 earlier than timing t1 to follow feedback voltage control value Vdccom_fb0 thereafter.

By correcting difference ΔVdc by a conversion ratio Vstd<1, the follow up property (represented by curve k3) deviating from the reference property (represented by curve k2) will match the reference property.

When output voltage Vm is lower than reference voltage Vstd, output voltage Vm follows feedback voltage control value Vdccom_fb0 as in pattern 3. Specifically, output voltage Vm starts from a point C indicating a voltage that is of lower level than reference voltage Vstd, rises faster than in pattern I since the on-duty (D02+1−Rcom) of NPN transistor Q2 is larger than that of pattern I (D00+1−Rcom), and crosses feedback voltage control value Vdccom_fb0 at timing t1. Then, output voltage Vm follows feedback voltage control value Vdccom_fb0 in accordance with curve k2 as in pattern 1.

In this context, output voltage Vm follows feedback voltage control value Vdccom_fb0 in accordance with curve k4 when correction of feedback preliminary voltage control value Vdccorm_fb_pr is not conducted by corrector 524. Specifically, output voltage Vm rises at a speed identical to that of pattern 1, crosses feedback voltage control value Vdccom_fb0 at timing t3 later than timing t1, and then follows feedback voltage control value Vdccom_fb0 thereafter.

Thus, by correcting difference ΔVdc with a conversion ratio Vstd>1, the follow-up property (represented by curve k4) deviated from the reference property (represented by curve k2) will match the reference property.

Since feedback voltage control Vdccom_fb0 (=Vdccom_fb_pr) is a designated voltage calculated for feedback control such that output voltage Vm is equal to output control value Vdccom, the follow-up of output voltage Vm to feedback voltage control value Vdccom_fb0 is equal to the follow-up of output voltage Vm to voltage control value Vdccom.

Therefore, when output voltage Vm is not equal to reference voltage Vstd, control is effected such that feedback preliminary voltage control value Vdccom_fb_pr is corrected and the follow-up property of output voltage Vm with respect to output control value Vdccom is equal to the reference property.

Thus, by correcting feedback preliminary voltage control value Vdccom_fb_pr based on output voltage Vm, the follow-up property of output voltage Vm with respect to voltage control value Vdccom can be kept constant even if output voltage Vm varies.

An operation of control in the voltage conversion of the direct current voltage into output voltage Vm at voltage-up converter 12 will be described with reference to FIG. 9. Upon initiation of the operation, voltage sensor 10 detects direct current voltage Vb from DC power supply B to provide the detected direct current voltage Vb to control device 30. Voltage sensor 13 detects output voltage Vm of voltage-up converter 12 to provide the detected output voltage Vm to control device 30 (step S1).

At control device 30, subtracter 521 calculates a difference ΔVdc between output voltage Vm and voltage control value Vdccom to provide a calculated difference ΔVdc to gain determination unit 522 and PI controller 523 (step S2). Then, gain determination unit 522 determines the control gain constituted of proportional gain PG and integration gain IG in accordance with difference ΔVdc (step S3).

PI controller 523 receives the control gain from gain determination unit 522 and difference ΔVdc from subtracter 521 to insert proportional gain PG, integration gain IG and difference ΔVdc into equation (1) to calculate feedback preliminary voltage control value Vdccom_fb_pr (step S4).

Corrector 524 receives feedback preliminary voltage control value Vdccom_fb_pr from PI controller 523 and output voltage Vm from voltage sensor 13 to correct feedback preliminary voltage control value Vdccom_fb_pr in accordance with output voltage Vm based on equation (2) to calculate feedback voltage control value Vdccom_fb where the follow-up property of output voltage Vm to voltage control value Vdccom is equal to the reference property. Then, corrector 524 provides the calculated feedback voltage control value Vdccom_fb to duty ratio calculation unit 541 (step S5).

Duty ratio calculation unit 541 calculates the duty ratio (any of DR0, DR1 and DR2) by the method set forth above based on feedback voltage control value Vdccom_fb, and provides the calculated duty ratio to adder 542 (S6).

Forward compensator 525 receives direct current voltage Vb from voltage sensor 10 and voltage control value Vdccom from inverter input voltage control value calculation unit 50 to calculate and provide to adder 542 compensation ratios Rcom and 1−Rcom based on equation (3).

Adder 542 adds compensation ratios Rcom and 1−Rcom from forward compensator 525 to the duty ratio from duty ratio calculation unit 541, and provides the compensation duty ratios to PWM signal converter 543. PWM signal converter 543 generates signal PWU based on the compensation duty ratios from adder 542 (step S7), and provides the generated signal PWU to voltage-up converter 12.

NPN transistors Q1 and Q2 of voltage-up converter 12 are turned on/off in accordance with signal PWU. Voltage-up converter 12 is controlled such that output voltage Vm is equal to voltage control value Vdccom (step S8). Then, the series of operations ends (step S9).

An operation of motor driver 100 will be described with reference to FIG. 1 again. Control device 30 responds to a torque control value TR input from the external ECU to generate signal SE required to turn on system relays SR1 and SR2, and provides the generated signal SE to system relays SR1 and SR2. Control device 30 also generates and provides to voltage-up converter 12 and inverter 14 signals PWU and PWMI, respectively, required to control voltage-up converter 12 and inverter 14 such that alternating current motor M1 generates torque control value TR.

DC power supply B outputs direct current voltage Vb, and system relays SR1 and SR2 supply direct current voltage Vb to capacitor C1. Capacitor C1 smoothes the supplied direct current voltage Vb to provide the smoothed direct current voltage Vb to voltage-up converter 12.

Accordingly, NPN transistors Q1 and Q2 of voltage-up converter 12 are turned on/off in accordance with signal PWU from control device 30, and direct current voltage Vb is converted into a voltage Vm to be supplied to capacitor C2. Voltage sensor 13 detects output voltage Vm that is the voltage across capacitor C2 to provide the detected output voltage Vm to control device 30.

As described above, control device 30 calculates difference ΔVdc between voltage control value Vdccom and output voltage Vm to determine the PI control gain in accordance with the calculated difference ΔVdc. Control device 30 corrects the feedback preliminary voltage control value calculated using the determined PI control gain in accordance with output voltage Vm, and generates and provides to voltage-up converter 12 signal PWU where the follow-up property of output voltage Vm with respect to voltage control value Vdccom is equal to the reference property. Accordingly, voltage-up converter 12 converts the direct current voltage into output voltage Vm such that output voltage Vm is equal to voltage control value Vdccom while achieving consistency between the follow-up property of output voltage Vm to voltage control value Vdccom and the reference property.

Capacitor C2 smoothes and supplies to inverter 14 the direct current voltage from voltage-up converter 12. NPN transistors Q3-Q8 of inverter 14 are turned on/off in accordance with signal PWMI from control device 30. Inverter 14 converts the direct current voltage into the alternating voltage, and provides a predetermined alternating current to each of the U-phase, V-phase and W-phase of alternating current motor M1 such that alternating current motor M1 generates the torque designated by torque control value TR. Thus, alternating current motor M1 generates torque designated by torque control value TR.

When the hybrid vehicle or electric vehicle in which motor driver 100 is incorporated attains the regenerative braking mode, control device 30 receives a signal indicating entry of the regenerative braking mode from the external ECU to generate and provide to inverter 14 and voltage-up converter 12 signals PWMC and PWD, respectively.

Alternating current motor M1 generates the alternating voltage and supplies the generated alternating current to inverter 14. Inverter 14 converts the alternating voltage into the direct current voltage in accordance with signal PWMC from control device 30, and supplies the converted direct current voltage to voltage-up converter 12 via capacitor C2.

Voltage-up converter 12 down-converts the direct current voltage in accordance with signal PWD from control device 30 to supply the down-converted voltage to DC power supply B, whereby DC power supply B is charged.

Thus, in motor driver 100, direct current voltage Vb from DC power supply B is converted into output voltage Vm such that the follow-up property of output voltage Vm of voltage-up converter 12 with respect to voltage control value Vdccom is equal to the reference property, the converted output voltage Vm is supplied to inverter 14 by a capacitor C2, and alternating current motor M1 is driven such that torque specified by torque control value TR is generated. In the regenerative braking mode, motor driver 100 is driven such that DC power supply B is charged by the power generated by alternating current motor M1.

In the present invention, voltage-up converter 12 and also feedback voltage control value calculation unit 52 and duty ratio converter 54 of control device 30 constitute the "voltage conversion apparatus".

In the present invention, feedback voltage control value calculation unit 52 and duty ratio converter 54 constitute the "control means" for controlling voltage-up converter 12 identified as a voltage converter.

PI controller 523 constitutes the "computing element" that calculates feedback preliminary voltage control value Vdccom_fb_pr.

Figure 9:
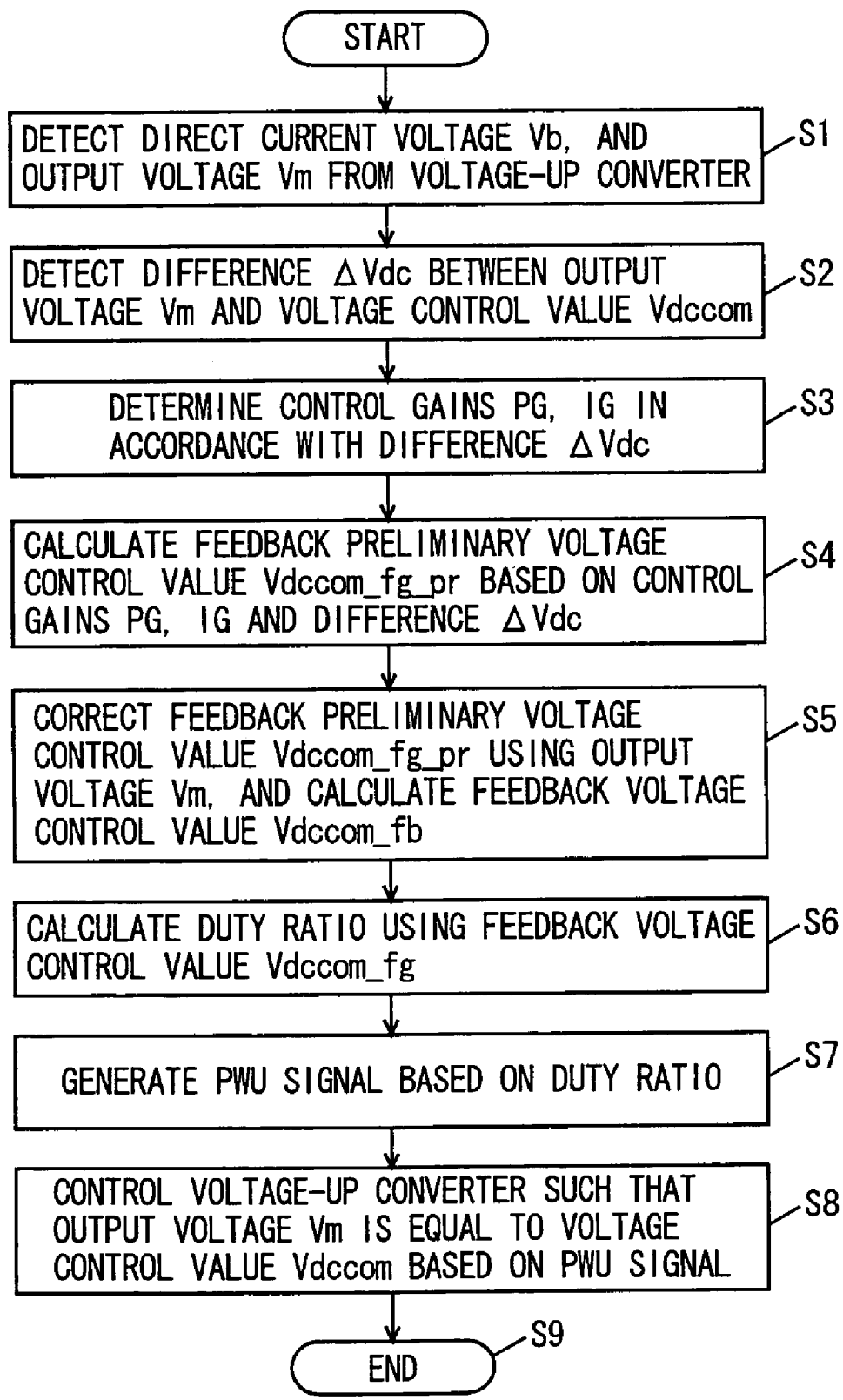
FIG. 9 is a flow chart to describe an operation of voltage conversion control in the first embodiment.

The voltage conversion method of the present invention corresponds to the voltage conversion method of converting the direct current voltage into output voltage Vm under feedback control in accordance with the flow chart of FIG. 9.

The feedback control in feedback voltage control value calculation unit 52 and duty ratio converter 54 is carried out actually by a CPU (Central Processing Unit). The CPU reads out a program including the respective steps in the flow chart of FIG. 9 from a ROM (Read Only Memory), and executes that program to control voltage conversion of the direct current voltage into output voltage Vm in accordance with the flow chart of FIG. 9. Therefore, the ROM corresponds to a computer (CPU) readable recording medium on which the program including respective steps in the flow chart of FIG. 9 is recorded.

In accordance with the first embodiment, the voltage conversion apparatus includes control means for correcting the feedback preliminary voltage control value calculated based on the difference between an output voltage and a designated voltage to a feedback voltage control value where the follow-up property of the output voltage to the voltage control value is equal to the reference property, under feedback control such that the output voltage that is a converted version of the direct current voltage from a DC power supply is equal to a voltage control value. Therefore, the direct current voltage can be converted into an output voltage while keeping the follow-up property of the output voltage with respect to a voltage control value constant.

SECOND EMBODIMENT

Figure 10:
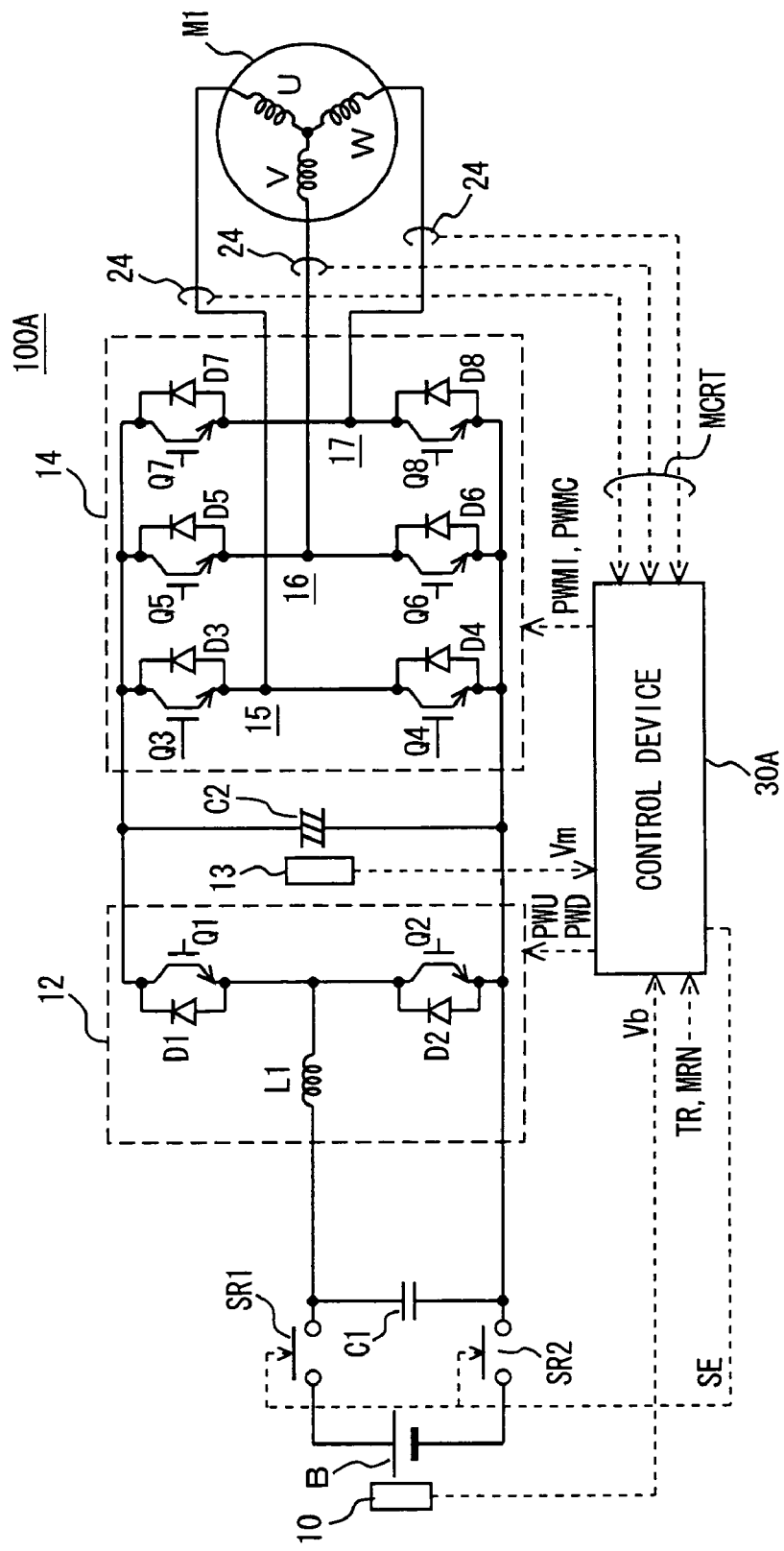
FIG. 10 is a schematic block diagram of a motor driver including a voltage conversion apparatus according to a second embodiment.

Referring to FIG. 10, a motor driver 100A including a voltage conversion apparatus according to a second embodiment of the present invention differs from motor driver 100 only in that a control device 30A is provided instead of control device 30 of motor driver 100.

Figure 11:
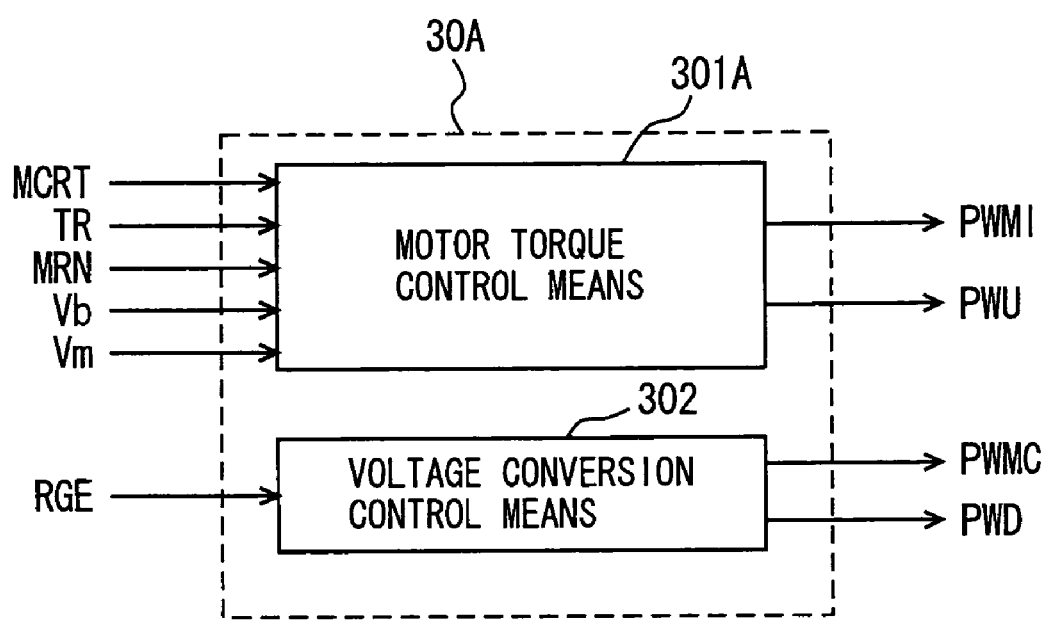
FIG. 11 is a functional block diagram of a control device in FIG. 9.

Referring to FIG. 11, control device 30A differs from control device 30 only in that a motor torque control means 301A is provided instead of motor torque control means 301 of control device 30.

Motor torque control means 301A generates and provides to inverter 14 a signal PWMI through a method identical to that of motor torque control means 301, and generates and provides to voltage-up converter 12 a signal PWU for controlling NPN transistors Q1 and Q2 of voltage-up converter 12 through a method that will be described afterwards.

Figure 12:
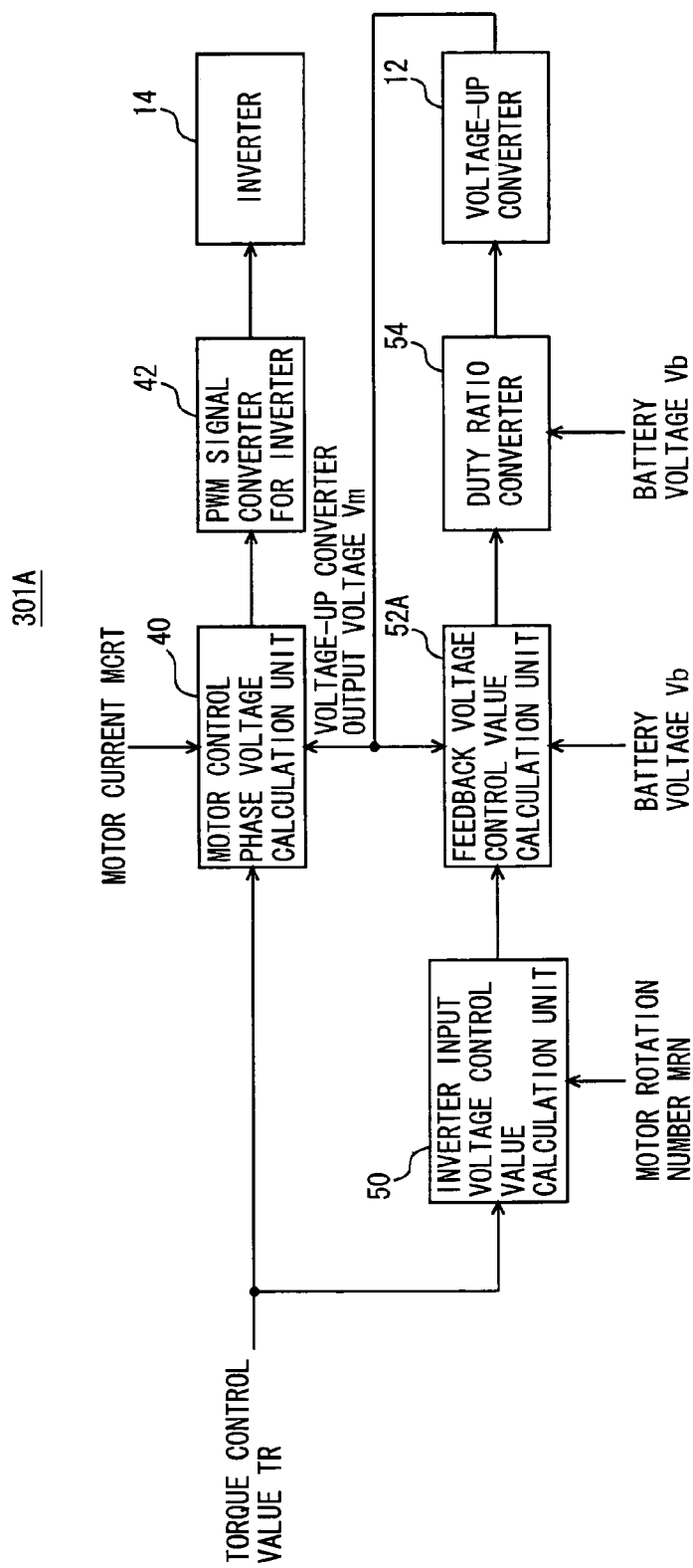
FIG. 12 is a functional block diagram to describe the function of a motor torque control means in FIG. 10.

Referring to FIG. 12, motor torque control means 301A differs from motor torque control means 301 only in that a feedback voltage control value calculation unit 52A is provided instead of feedback voltage control value calculation unit 52 of motor torque control means 301.

Feedback voltage control value calculation unit 52A corrects difference ΔVdc between output voltage Vm and voltage control value Vdccom to calculate feedback voltage control value Vdccom_fbv2 such that the follow-up property of output voltage Vm to voltage control value Vdccom is equal to the reference property, based on voltage control value Vdccom from inverter input voltage control value calculation unit 50 and output voltage Vm from output sensor 13.

Figure 13:
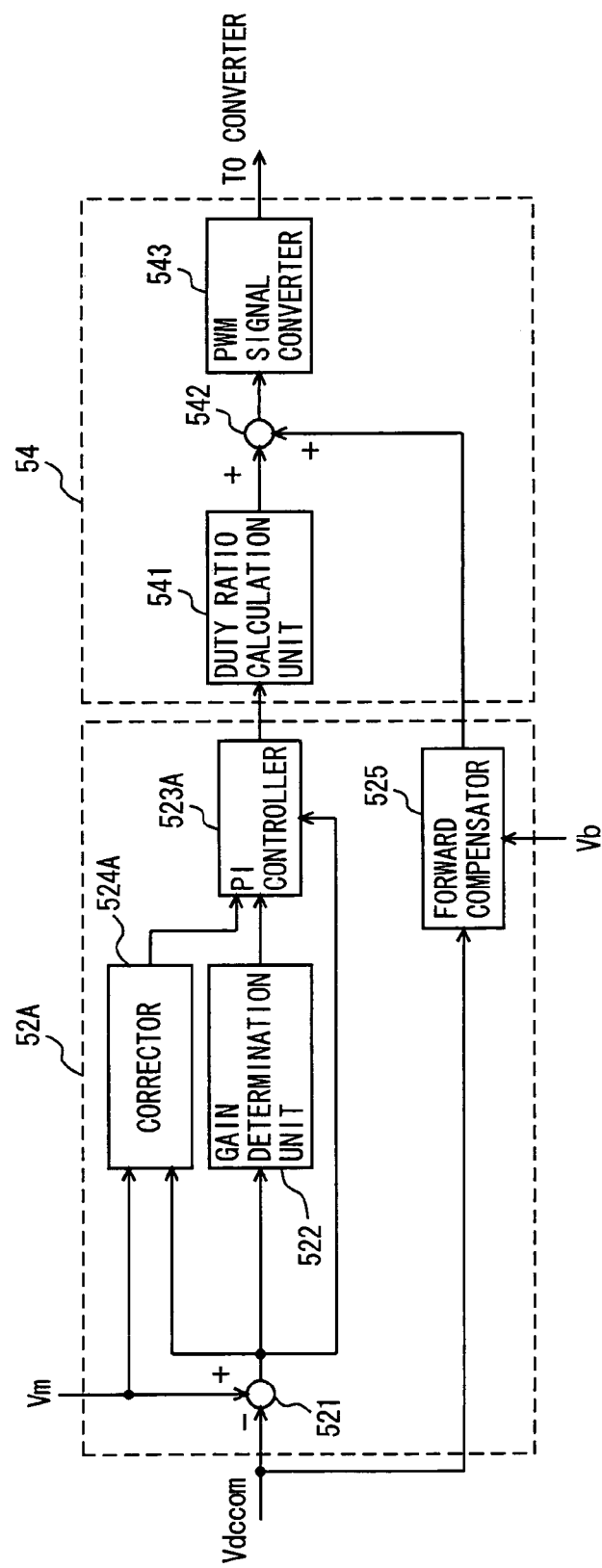
FIG. 13 is a functional block diagram to describe the function of a feedback voltage control value calculation unit and duty ratio converter in FIG. 11.

Referring to FIG. 13, feedback voltage control value calculation unit 52A differs from feedback voltage control value calculation unit 52 only in that a corrector 524A is provided instead of corrector 524 of feedback voltage control value calculation unit 52, and a PI controller 523A is provided instead of PI controller 523.

In feedback voltage control value calculation unit 52A, subtracter 521 provides the calculated difference ΔVdc to gain determination unit 522, PI controller 523A and corrector 524A. Corrector 524A receives difference ΔVdc from subtracter 521 and output voltage Vm from voltage sensor 13 to correct difference ΔVdc in accordance with output voltage Vm through the following equation.

$$\Delta Vdcc = \Delta Vdc \times \frac{Vstd}{Vm} \quad (6)$$

Then, corrector 524A provides the corrected correction difference ΔVdcc to PI controller 523A.

Corrector 524A divides reference voltage Vstd by output voltage Vm to calculate a conversion ratio required to convert output voltage Vm into reference voltage Vstd where the follow-up property of output voltage Vm with respect to voltage control value Vdccom is equal to the reference property. Corrector 524A multiplies the calculated conversion ratio by difference ΔVdc to calculate correction difference ΔVdcc required to obtain feedback voltage control value Vdccom_fbv2 where the follow-up property of output voltage Vm with respect to voltage control value Vdccom is equal to the reference property.

PI controller 523A receives the control gain from gain determination unit 522 (proportional gain PG and integration gain IG), and correction difference ΔVdcc from corrector 524A to calculate feedback voltage control value Vdccom_fbv2 by inserting proportional gain PG, integration gain IG and correction difference ΔVdcc into the following equation.

$$Vdccom\_fbv2 = PG \times \Delta Vdcc + IG \times \Sigma \Delta Vdcc \quad (7)$$

PI controller 523A provides the calculated feedback voltage control value Vdccom_fbv2 to duty ratio calculation unit 541. Inserting equation (1) into equation (2) yields:

$$Vdccom\_fb = PG \times \Delta Vdc \times \frac{Vstd}{Vm} + IG \times \Sigma \Delta Vdc \times \frac{Vstd}{Vm} \quad (8)$$

Further, inserting equation (6) into equation (7) yields:

$$Vdccom\_fb = PG \times \Delta Vdc \times \frac{Vstd}{Vm} + IG \times \Sigma \Delta Vdc \times \frac{Vstd}{Vm} \quad (9)$$

Accordingly, feedback voltage control value Vdccom_fbv2 output from feedback voltage control value calculation unit 52A matches feedback voltage control value Vdccom_fb output from feedback voltage control value calculation unit 52 in the first embodiment.

In the first embodiment, feedback voltage control value calculation unit 52 calculates feedback preliminary voltage control value Vdccom_fb_pr using difference ΔVdc and the control gain (proportional gain PG and integration gain IG) determined according to difference ΔVdc, and corrects the calculated feedback preliminary voltage control value Vdccom_fb_pr using the conversion ratio Vstd/Vm to calculate feedback voltage control value Vdccom_fb.

In the second embodiment, feedback voltage control value calculation unit 52A corrects difference ΔVdc using conversion ratio Vstd/Vm. Specifically, when output voltage Vm is equal to reference voltage Vstd, corrector 524A multiplies difference ΔVdc from subtractor 521 by the conversion ratio Vstd/Vm=1 to output a correction difference ΔVdcc constituted of difference ΔVdc. When output voltage Vm is greater than reference voltage Vstd, corrector 524A multiplies difference ΔVdc by conversion ratio Vstd/Vm<1 to output a correction difference ΔVdcc constituted of ΔVdc×(Vstd/Vm). When output voltage Vm is lower than reference voltage Vstd, corrector 524A multiplies difference ΔVdc by conversion ratio Vstd/Vm>1 to output correction difference ΔVdcc constituted of ΔVdc×(Vstd/Vm).

When output voltage Vm is equal to reference voltage Vstd, feedback voltage control value Vdccom_fbv2=Vdccom_fb0 is established, whereby the follow-up property of output voltage Vm to voltage control value Vdccom corresponds to pattern 1 of FIG. 8. When output voltage Vm is higher than reference voltage Vstd, feedback voltage control value Vdccom_fbv2=Vdccom_fb1 is established, whereby the follow-up property of output voltage Vm with respect to voltage control value Vdccom corresponds to pattern 2 shown in FIG. 8. In other words, by correcting difference ΔVdc with conversion ratio Vstd<1, the follow-up property (represented by curve k3) deviating from the reference property (represented by curve k2) matches the reference property. When output voltage Vm is lower than reference voltage Vstd, feedback voltage control value Vdccom_fbv2=Vdccom_fb2 is established, whereby the follow-up property of output voltage Vm with respect to voltage control value Vdccom corresponds to pattern 3 of FIG. 8. In other words, by correcting difference ΔVdc with conversion ratio Vstd>1, the follow-up property (represented by curve k4) deviating from the reference property (represented by curve k2) matches the reference property.

Thus, when output voltage Vm deviates from reference voltage Vstd, corrector 524A corrects difference ΔVdc in accordance with output voltage Vm such that the follow-up property of output voltage Vm with respect to voltage control value Vdccom is equal to the reference property.

Correction difference ΔVdcc is used to set the follow-up property of output voltage Vm with respect to voltage control value Vdccom equal to the reference property.

Feedback voltage control value calculation units 52 and 52A are common in the feature of calculating feedback voltage control values Vdccom_fb and Vdccom_fbv2 where the follow-up property of output voltage Vm to voltage control value Vdccom is equal to the reference property.

The second embodiment is characterized in that difference ΔVdc between output voltage Vm and voltage control value Vdccom is corrected in accordance with output voltage Vm, and feedback voltage control value Vdccom_fbv2 (=Vdccom_fb) where the follow-up property of output voltage Vm to voltage control value Vdccom is equal to the reference voltage is calculated using the corrected correction difference ΔVdcc. The proportional gain PG and integration gain IG constituting the control gain are not corrected.

An operation of controlling voltage conversion in the second embodiment will be described with reference to FIG. 14. The flow chart of FIG. 14 differs from the flow chart of FIG. 9 only in that steps S4 and S5 in the flow chart of FIG. 9 are replaced with steps S4*a* and S5*a*, respectively.

Following step S3, corrector 524A receives difference ΔVdc from subtracter 521 and output voltage Vm from voltage sensor 13 to correct difference ΔVdc based on equation (6) (step 4*a*). Corrector 524A provides correction difference ΔVdcc to PI controller 523A.

PI controller 523A receives the control gain from gain determination unit 522 (proportional gain PG and integration gain IG), and correction difference ΔVdcc from corrector 524A to calculate feedback voltage control value Vdccom_fbv2 (=Vdccom_fb) by equation (7), and provides the calculated feedback voltage control value Vdccom_fbv2 to duty ratio calculation unit 541 (step S5*a*).

Then, steps S6-S8 set forth before are executed, and the series of operations ends (step S9).

In the present invention, voltage-up converter 12 and also feedback voltage control value calculation unit 52A and duty ratio converter 54 of control device 30A constitute the "voltage conversion apparatus".

In the present invention, feedback voltage control value calculation unit 52A and duty ratio converter 54 constitute the "control means" controlling voltage-up converter 12 identified as the voltage converter.

PI controller 523A constitutes the "computing element" calculating feedback voltage control value Vdccom_fb.

Feedback voltage control value calculation unit 52A calculates feedback voltage control value Vdccom_fbv2 (=Vdccom_fb) where the follow-up property of output voltage Vm to voltage control value Vdccom is equal to the reference voltage, likewise feedback voltage control value calculation unit 52. Therefore, the feedback voltage control value calculation unit in the present invention is arbitrary as long as the feedback voltage control value where the follow-up property of output voltage Vm to voltage control value Vdccom is equal to the reference property is calculated by correcting difference ΔVdc or feedback preliminary voltage control value Vdccom_fb_pr by conversion ratio Vstd/Vm.

Figure 14:
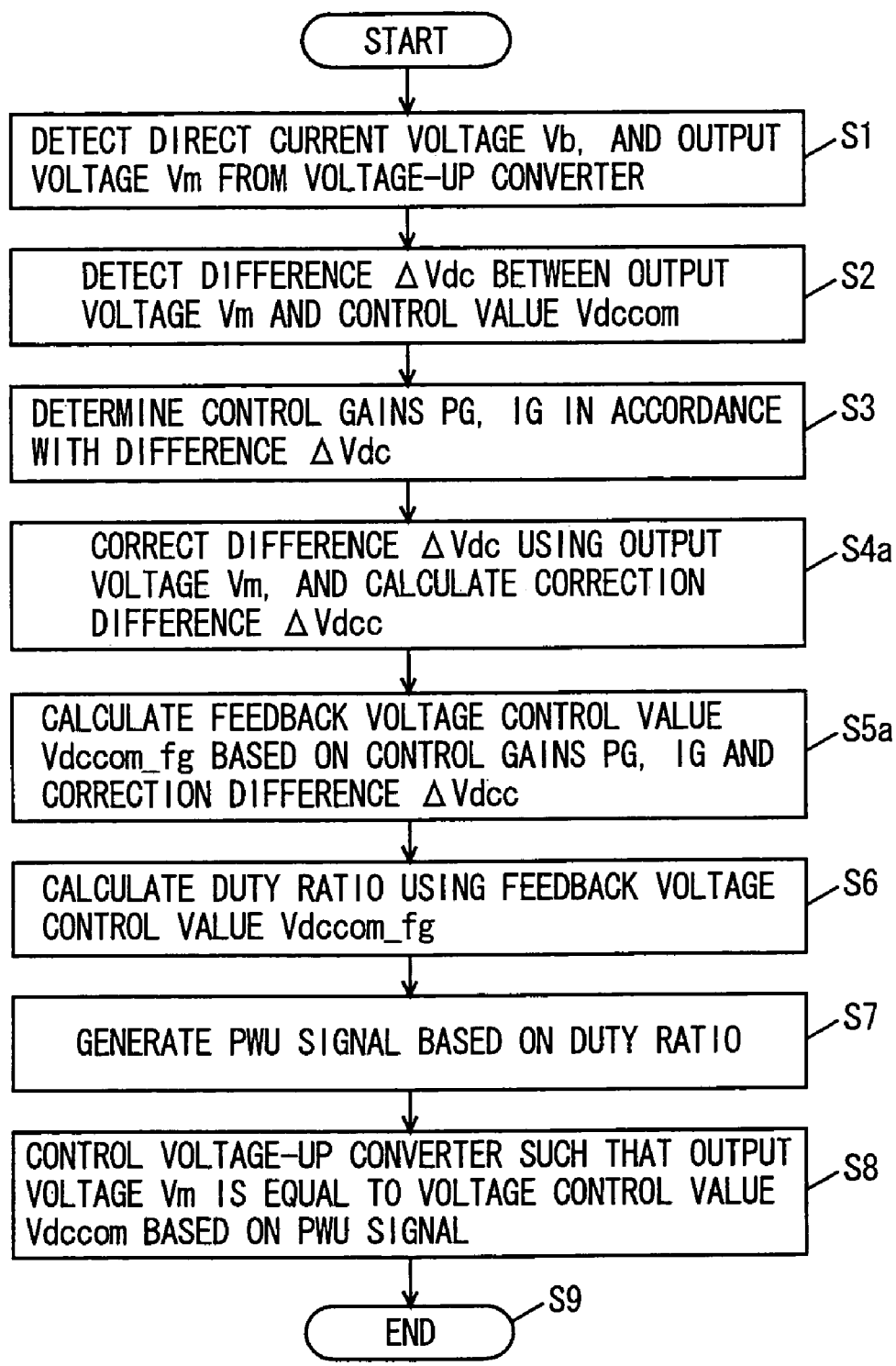
FIG. 14 is a flow chart to describe an operation of voltage conversion control in the second embodiment.

The voltage conversion method of the present invention is a voltage conversion method of converting the direct current voltage into output voltage Vm under feedback control in accordance with the flow chart of FIG. 14.

Furthermore, feedback control in feedback voltage control value calculation unit 52A and duty ratio converter 54 is carried out in practice by a CPU (Central Processing Unit). The CPU reads out a program including respective steps of the flow chart of FIG. 14 from a ROM (Read Only Memory), and executes the program read out to control voltage conversion of the direct current voltage into output voltage Vm in accordance with the flow chart of FIG. 14. Therefore, the ROM is equivalent to a computer (CPU) readable recording medium on which a program including respective steps in the flow chart of FIG. 14 is recorded.

The voltage conversion method of the present invention may have steps S4 and S5 of FIG. 9 or steps S4*a* and S5*a* of FIG. 14 replaced with the step of "calculating feedback voltage control value Vdccom_fb where the follow-up property of output voltage Vm with respect to voltage control value Vdccom is equal to the reference property, based on difference ΔVdc and the control gain (proportional gain PG and integration gain IG)".

This step is also applicable to a program recorded in a ROM.

The remaining elements are similar to those of the first embodiment.

In accordance with the second embodiment, the voltage conversion apparatus includes control means correcting the difference between the output voltage and the designated voltage into the difference where the follow-up property of the output voltage with respect to the voltage control value is equal to the reference property, and calculating the feedback voltage control value using the corrected correction difference in the feedback control where the output voltage corresponding to a converted version of the direct current voltage from the DC power supply is equal to the voltage control value. Therefore, the direct current voltage can be converted into the output voltage while keeping the follow-up property of the output voltage with respect to the voltage control value constant.

THIRD EMBODIMENT

Figure 15:
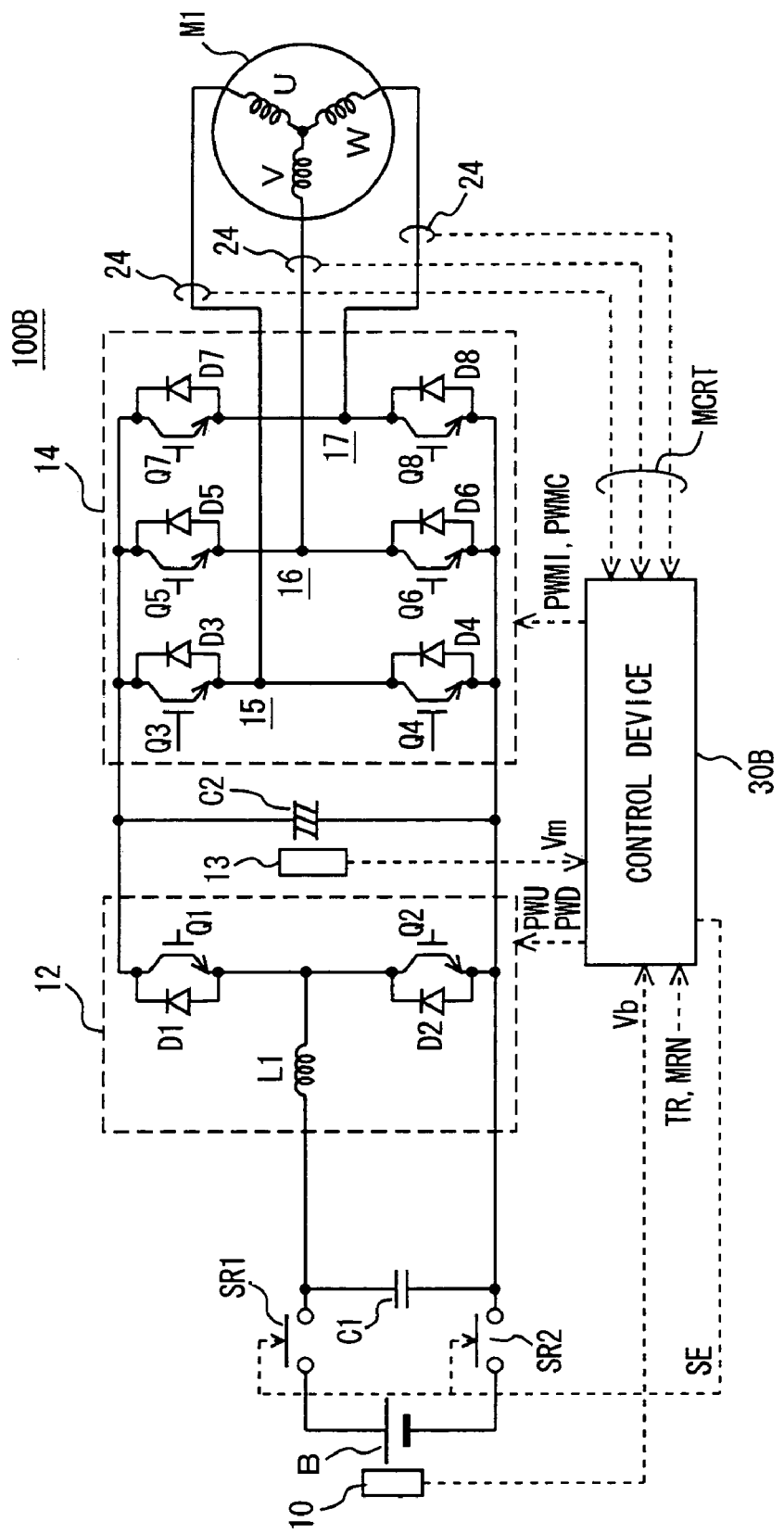
FIG. 15 is a schematic block diagram of a motor driver including a voltage conversion apparatus according to a third embodiment.

Referring to FIG. 15, a motor driver 100B including a voltage conversion apparatus according to a third embodiment of the present invention differs from motor driver 100 only in that a control device 30B is provided instead of control device 30 of motor driver 100.

Figure 16:
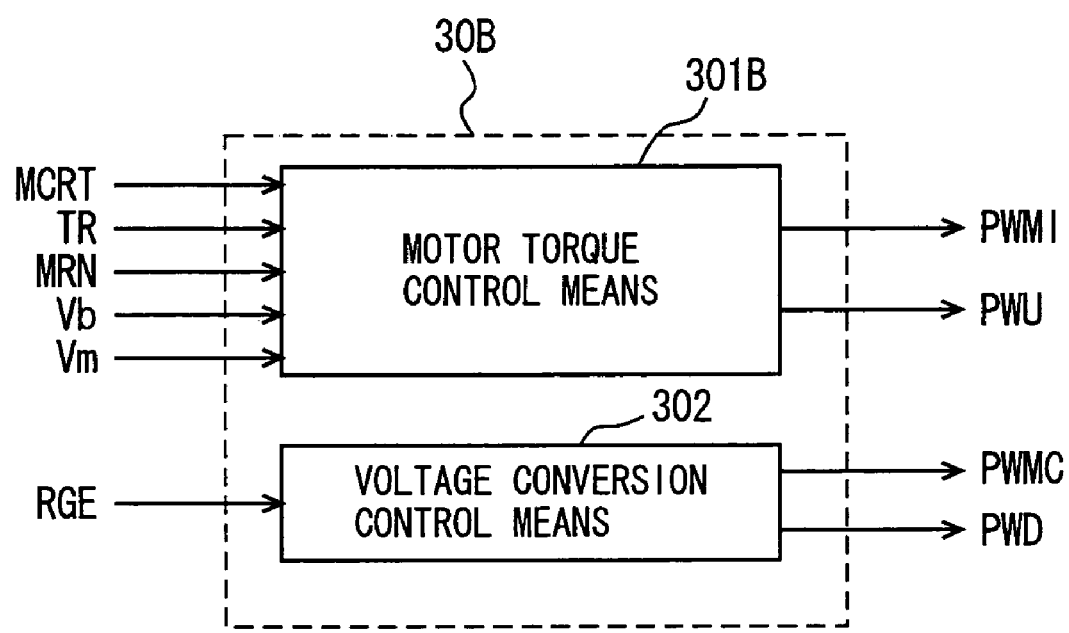
FIG. 16 is a functional block diagram of a control device in FIG. 14.

Referring to FIG. 16, control device 30B differs from control device 30 only in that a motor torque control means 301B is provided instead of motor torque control means 301 of control device 30.

Motor torque control means 301B generates a signal PWMI by a method identical to that of motor torque control means 301, and also generates signal PWU in accordance with the method that will be described afterwards to provide the generated signal PWU to voltage-up converter 12.

Figure 17:
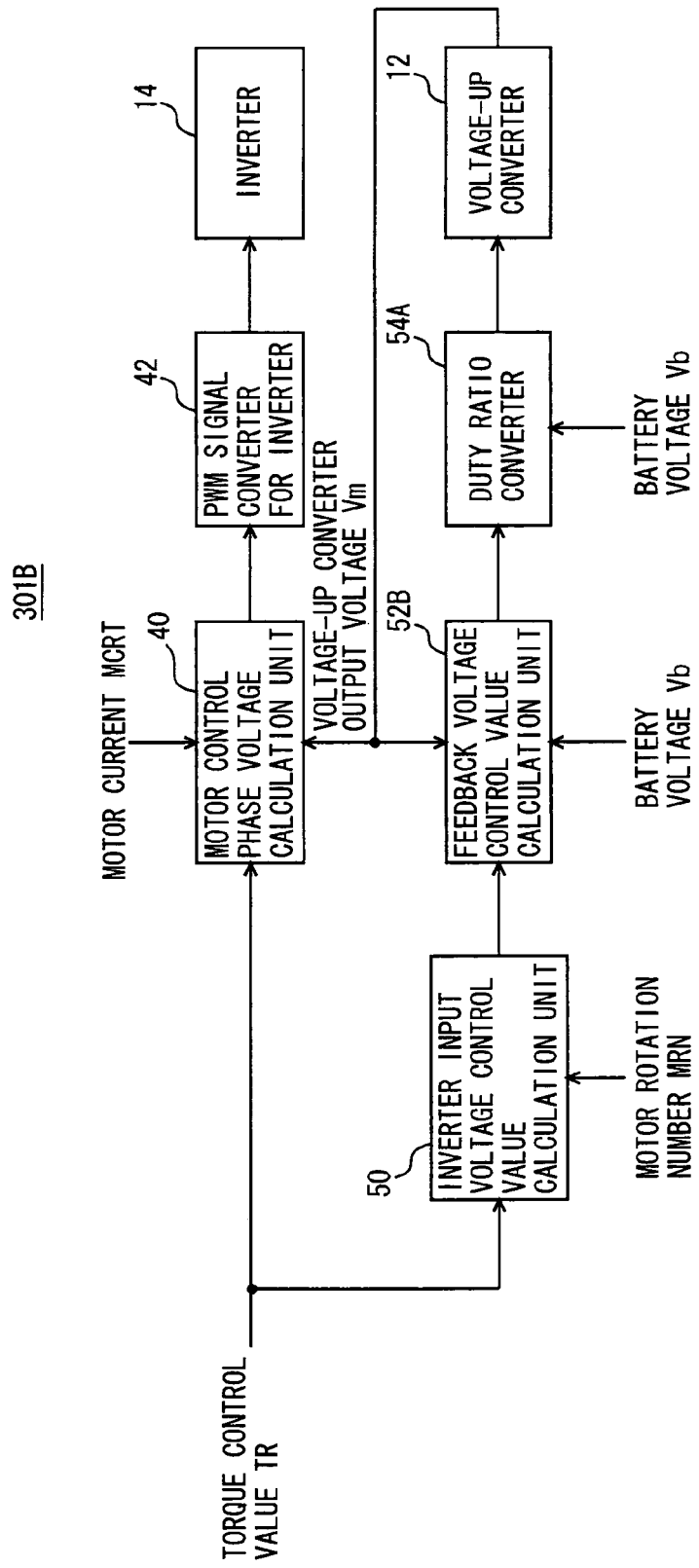
FIG. 17 is a functional block diagram to describe a function of a motor torque control means in FIG. 15.

Referring to FIG. 17, motor torque control means 301B differs from motor torque control means 301 only in that a feedback voltage control value calculation unit 52B is provided instead of feedback voltage control value calculation unit 52 of motor torque control means 301, and a duty ratio converter 54A is provided instead of duty ratio converter 54.

Feedback voltage control value calculation unit 52B calculates feedback voltage control value Vdccom_fbv3 based on voltage control value Vdccom from inverter input voltage control value calculation unit 50 and output voltage Vm from voltage sensor 13 to provide the calculated feedback voltage control value Vdccom_fbv3 to duty ratio converter 54A. Feedback voltage control value calculation unit 52B functions likewise feedback voltage control value calculation unit 52.

Duty ratio converter 54A generates and provides to voltage-up converter 12 a signal PWU required such that the follow-up property of output voltage Vm with respect to voltage control value Vdccom is equal to the reference property, based on feedback voltage control value Vdccom_fbv3, and compensation ratios Rcom, 1–Rcom from feedback voltage control value calculation unit 52B, and output voltage Vm from voltage sensor 13.

Figure 18:
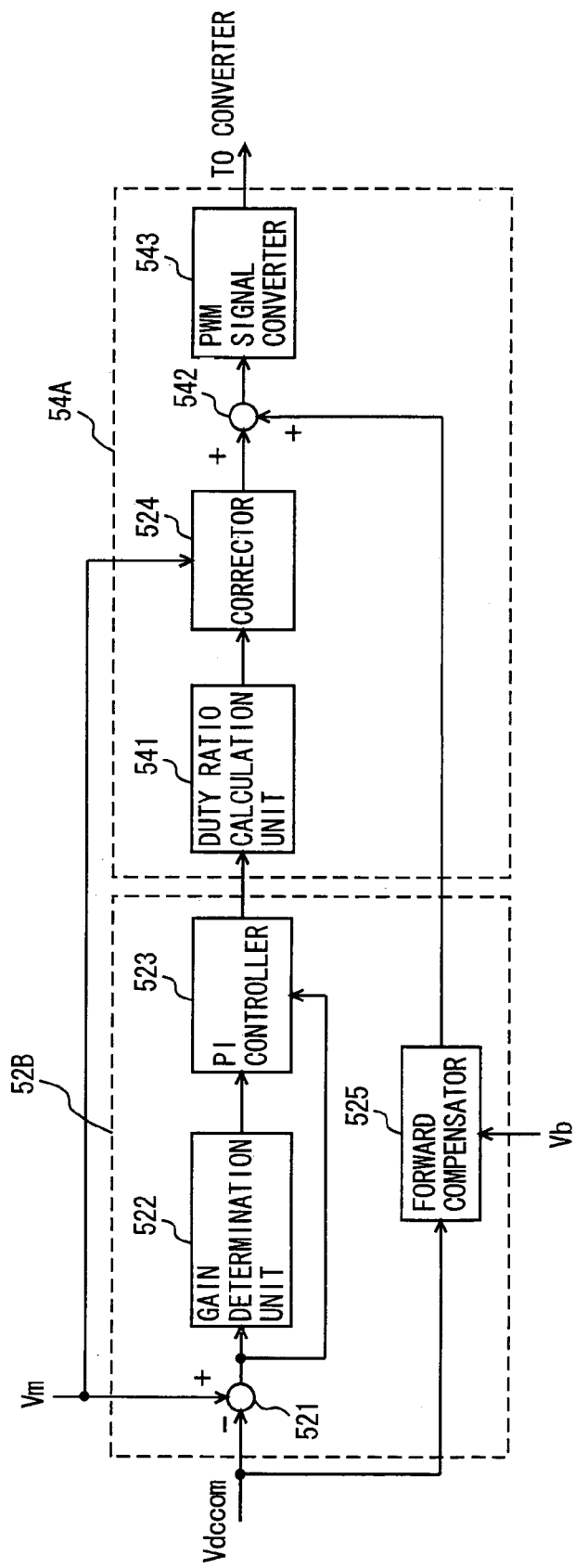
FIG. 18 is a functional block diagram to describe a function of a feedback voltage control value calculation unit and duty ratio converter in FIG. 16.

Referring to FIG. 18, feedback voltage control value calculation unit 52B differs from feedback voltage control value calculation unit 52 only in that corrector 524 of a feedback voltage control value calculation unit 52 is removed.

Therefore, feedback voltage control value calculation unit 52B inserts difference ΔVdc between output voltage Vm and voltage control value Vdccom, and the control gain (proportional gain PG and integration gain IG) into equation (1) to calculate feedback voltage control value Vdccom_fbv3. Feedback voltage control value calculation unit 52B provides the calculated feedback voltage control value Vdccom_fbv3 to duty ratio calculation unit 541.

Namely, feedback voltage control value calculation unit 52B calculates and provides to duty ratio calculation unit 541 a feedback voltage control value Vdccom_fbv3 determined from difference ΔVdc without conducting the correction as in the first and second embodiments.

Feedback voltage control value Vdccom_fbv3 is equal to feedback preliminary voltage control value Vdccom_fb_pr in the first embodiment.

Duty ratio converter 54A is similar to duty ratio converter 54, provided that a corrector 544 is added to duty ratio converter 54. Corrector 544 is disposed between duty ratio calculation unit 541 and adder 542. Corrector 544 receives duty ratio DRO from duty ratio calculation unit 541 and output voltage Vm from voltage sensor 13 to correct duty ratio DRO through the following equation using output voltage Vm to calculate correction duty ratio DRC.

$$DRC = DRO \times \frac{Vstd}{Vm} \qquad (10)$$

Then, corrector 544 provides correction duty ratio DRC to adder 542.

Corrector 544 divides reference voltage Vstd by output voltage Vm to calculate a conversion ratio that is required to convert output voltage Vm into reference voltage Vstd where the follow-up property of output voltage Vm with respect to voltage control value Vdccom is equal to the reference property. Corrector 544 multiplies the calculated conversion ratio by duty ratio DRO to calculate a correction duty ratio DRC where the follow-up property of output voltage Vm with respect to voltage control value Vdccom is equal to the reference property.

As set forth above, feedback voltage control value calculation unit 52B calculates feedback voltage control value Vdccom_fbv3 based on difference ΔVdc alone, without any correction. Duty ratio calculation unit 541 calculates duty ratio DRO based on feedback voltage control value Vdccom_fbv3.

In this case, duty ratio DRO is constant even if output voltage Vm varies as long as difference ΔVdc is constant since the duty ratio is calculated based on difference ΔVdc alone. Specifically, duty ratio calculation unit 541 calculates the duty ratio based on feedback voltage control value Vdccom_fbv3 to output to corrector 544 a duty ratio DRO identical to duty ratio DR0 shown in FIG. 6.

Corrector 544 corrects the duty ratio DRO from duty ratio calculation unit 541 based on equation (10) to output correction duty ratio DRC to adder 542.

When output voltage Vm matches reference voltage Vstd, corrector 544 multiplies duty ratio DRO from duty ratio calculation unit 541 by the conversion ratio Vstd/Vm=1 to provide correction duty ratio DRC constituted of duty ratio DRO (=DR0: refer to FIG. 6) to adder 542. When output voltage Vm is higher than reference voltage Vstd, corrector 544 multiplies duty ratio DRO from duty ratio calculation unit 541 by conversion ratio Vstd/Vm<1 to output to adder 542 a correction duty ratio DRC constituted of duty ratio DR1 shown in FIG. 6. When output voltage Vm is lower than reference voltage Vstd, corrector 544 multiplies duty ratio DRO from duty ratio calculation unit 541 by conversion ratio Vstd/Vm>1 to output to adder 542 a correction duty ratio DRC constituted of duty ratio DR2 shown in FIG. 6.

Then, adder 542 adds compensation ratios Rcom, 1−Rcom from forward compensator 525 to correction duty ratio DRC from corrector 544 to provide the compensation duty ratios to PWM signal converter 543.

Specifically, when output voltage Vm is equal to reference voltage Vstd, adder 542 adds compensation ratios Rcom, 1−Rcom to correction duty ratio DRC constituted of duty ratio DR0 shown in FIG. 6 to provide the compensation duty ratio constituted of duty ratios DR0U, DR0L shown in FIG. 6 to PWM signal converter 543. When output voltage Vm is higher than reference voltage Vstd, adder 542 adds compensation ratios Rcom, 1−Rcom to correction duty ratio DRC constituted of duty ratio DR1 shown in FIG. 6 to provide the compensation duty ratio constituted of duty ratios DR1U and DR1L shown in FIG. 6 to PWM signal converter 543. When output voltage Vm is lower than reference voltage Vstd, adder 542 adds compensation ratios Rcom, 1−Rcom to correction duty ratio DRC constituted of duty ratio DR2 shown in FIG. 6 to provide compensation duty ratio constituted of duty ratios DR2U and DR2L shown in FIG. 6 to PWM signal converter 543.

PWM signal converter 543 generates and provides to voltage-up converter 12 a signal PWU based on the compensation duty ratio from adder 542. Specifically, when output voltage Vm is equal to reference voltage Vstd, PWM signal converter 543 generates signals PWU0U and PWU0L shown in FIG. 7 based on the compensation duty ratio constituted of duty ratios DR0U and DR0L shown in FIG. 6, respectively, to provide a signal PWU0 constituted of signals PWU0U and PWU0L to voltage-up converter 12. When output voltage Vm is higher than reference voltage Vstd, PWM signal converter 543 generates signals PWU1U and PWU1L shown in FIG. 7 based on the compensated duty ratio of duty ratios DR1U and DR1L shown in FIG. 6, respectively, to provide a signal PWU1 constituted of signals PWU1U and PWU1L to voltage-up converter 12. When output voltage Vm is lower than reference voltage Vstd, PWM signal converter 543 generates signals PWU2U and PWU2L shown in FIG. 7 based on the compensation duty ratio constituted of duty ratios DR2U and DR2L shown in FIG. 6, respectively, to provide a signal PWU2 constituted of signals PWU2U and PWU2L to voltage-up converter 12.

Since duty ratio DRO output from duty ratio calculation unit 541 is not a duty ratio calculated taking into account variation in output voltage Vm, duty ratio DRO is compensated in accordance with output voltage Vm in the third embodiment to calculate correction duty ratio DRC where the follow-up property of output voltage Vm with respect to voltage control value Vdccom is equal to the reference property.

As a result, the direct current voltage Vb from DC power supply B is converted into output voltage Vm with the follow-up property of output voltage Vm to voltage control value Vdccom maintained at the reference property.

An operation of controlling voltage conversion in the third embodiment will be described with reference to FIG. 19. The flow chart of FIG. 19 differs from the flow chart of FIG. 9 only in that steps S5-S7 of the flow chart of FIG. 9 are replaced with steps S51-S53, respectively.

Following step S4, duty ratio calculation unit 541 calculates duty ratio DRO based on feedback voltage control value Vdccom_fbv3 to provide the calculated duty ratio DRO to corrector 544 (step S51). Corrector 544 corrects duty ratio DRO based on equation (10), and provides corrected duty ratio DRC to adder 542 (step S52).

Adder 542 adds compensation ratios Rcom, 1−Rcom from forward compensator 525 to correction duty ratio DRC from corrector 544 to provide a compensation duty ratio to PWM signal converter 543. PWM signal converter 543 generates a signal PWU0 (or PWU1 or PWU2) based on the compensation duty ratio from adder 542 (step S53). Then, step S8 is executed, and the series of operations ends (step S9).

In the present invention, voltage-up converter 12 and also feedback voltage control value calculation unit 52B and duty ratio converter 54A of control device 30B constitute the "voltage conversion apparatus".

In the present embodiment, feedback voltage control value calculation unit 52B and duty ratio converter 54A constitute the "control means" to control voltage-up converter 12 identified as the voltage converter.

Duty ratio calculation unit 541 of the third embodiment constitutes the "computing element" for calculating a preliminary duty ratio.

Figure 19:
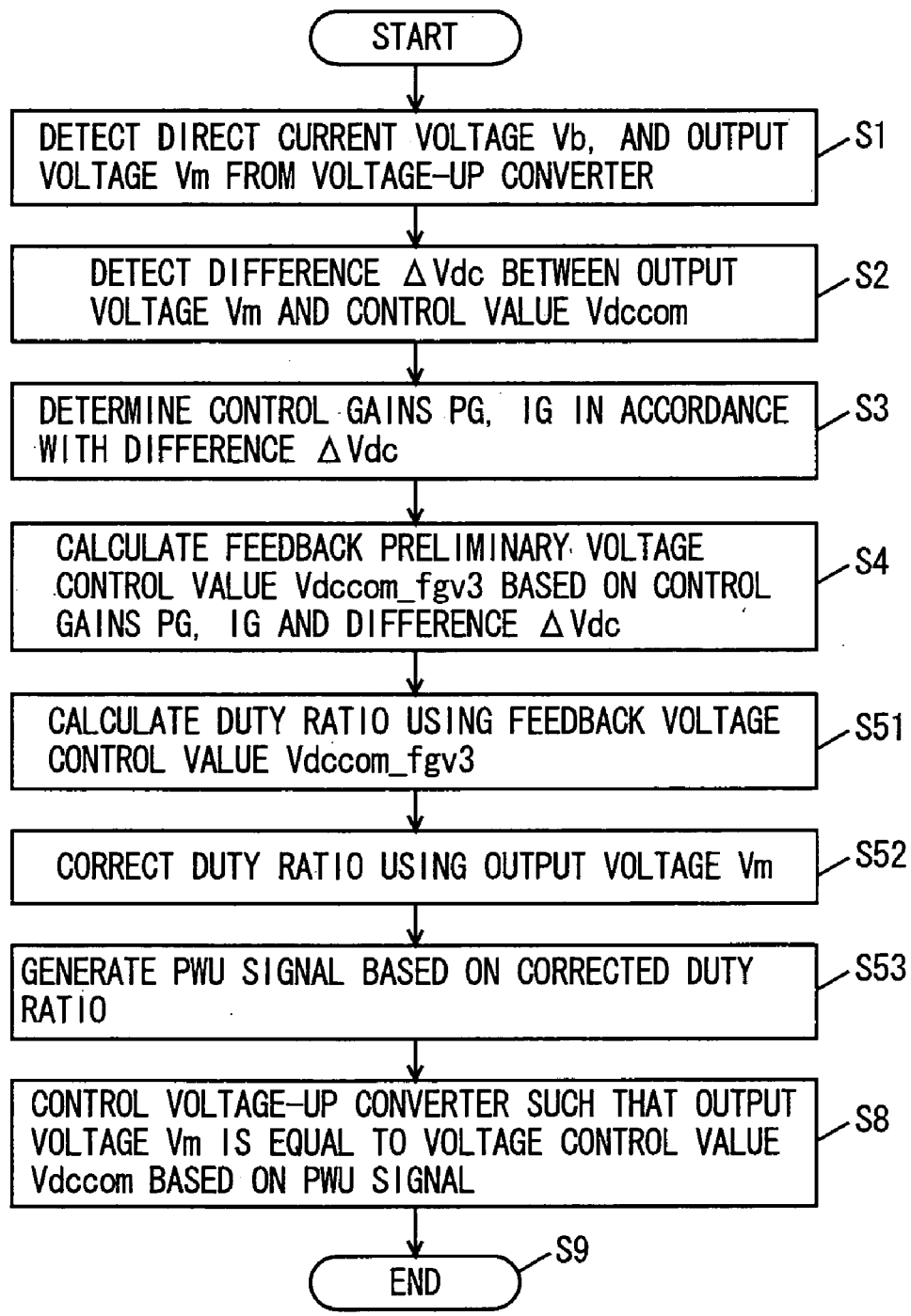
FIG. 19 is a flow chart to describe an operation of voltage conversion control according to a third embodiment.

The voltage conversion method of the present invention conducts feedback control in accordance with the flow chart of FIG. 19 to convert the direct current voltage into output voltage Vm.

The feedback control in feedback voltage control value calculation unit 52B and duty ratio conversion unit 54A is in practice carried out by the CPU (Central Processing Unit). The CPU reads out a program including respective steps of the flow chart of FIG. 19 from a ROM (Read Only Memory) to execute the program read out to control voltage conversion of the direct current voltage into output voltage Vm in accordance with the flow chart of FIG. 19. Therefore, the ROM is equivalent to a computer (CPU)—readable recording medium with a program including respective steps of the flow chart of FIG. 19 recorded thereon.

The remaining elements are similar to those of the first embodiment.

In accordance with the third embodiment, the voltage conversion apparatus includes control means correcting the duty ratio calculated based on the difference between the output voltage and the designated voltage into the duty ratio where the follow-up property of the output voltage with respect to the voltage control value is equal to the reference property, and controlling the voltage-up converter using the corrected duty ratio in the feedback control such that the output voltage corresponding to a converted version of the direct current voltage from the DC power supply is equal to the voltage control value. Therefore, the direct current voltage can be converted into the output voltage while keeping the follow-up property of the output voltage with respect to the voltage control value constant.

FOURTH EMBODIMENT

Figure 20:
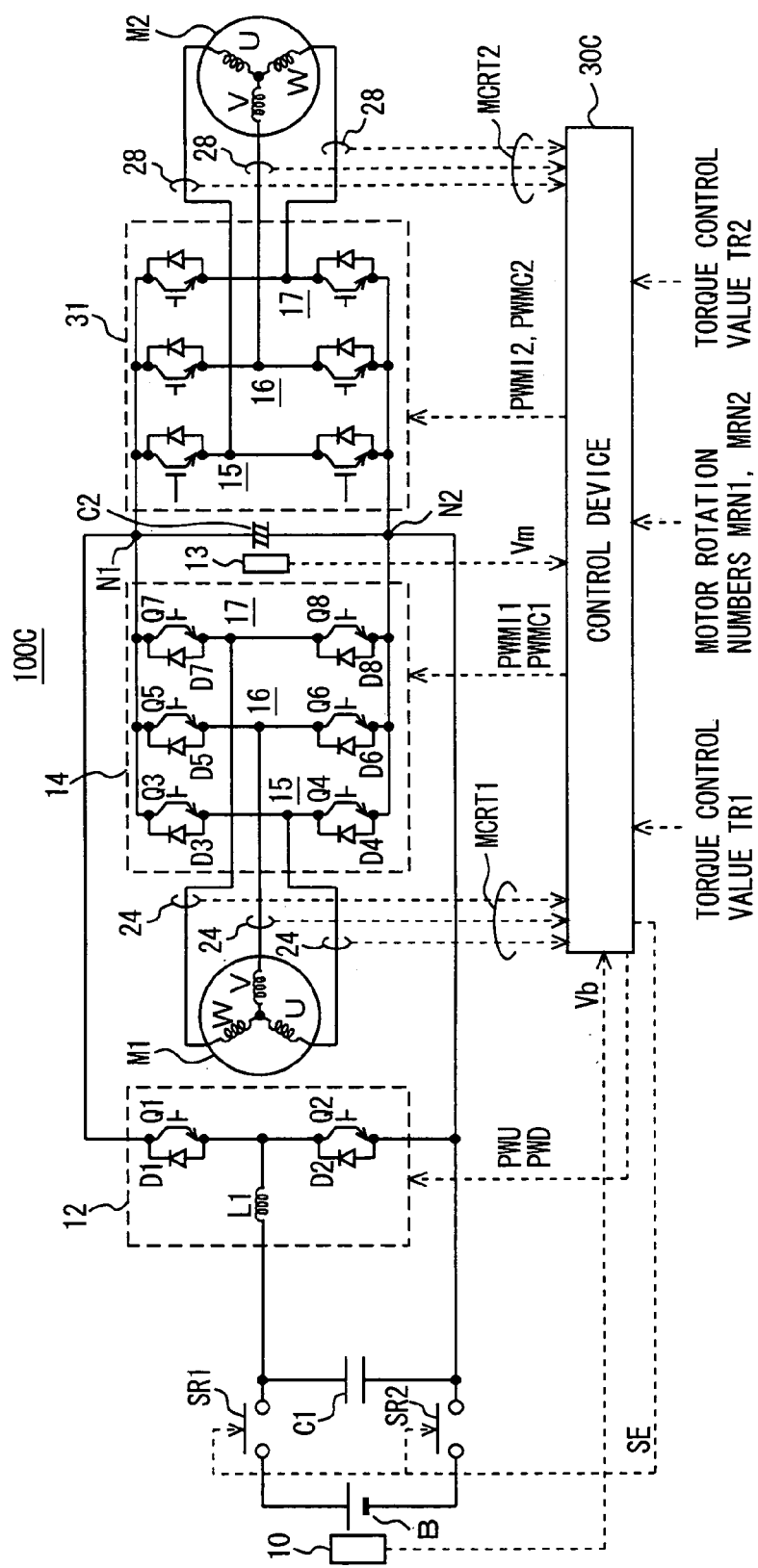
FIG. 20 is a schematic block diagram of a motor driver including a voltage conversion apparatus according to a fourth embodiment.

Referring to FIG. 20, a motor driver 100C incorporating a voltage conversion apparatus according to a fourth embodiment differs from motor driver 100 only in that a current sensor 28 and an inverter 31 are added to motor driver 100, and control device 30 of motor driver 100 is replaced with a control device 30C.

Capacitor C2 receives output voltage Vm from voltage-up converter 12 via nodes N1 and N2 to smooth the received output voltage Vm, and supplies the smoothed output voltage Vm to inverter 14 as well as to inverter 31. Current sensor 24 detects and provides to control device 30C a motor current MCRT1. Inverter 14 converts the direct current voltage from capacitor C2 into an alternating voltage based on a signal PWMI1 from control device 30C to drive alternating current motor M1, and converts the alternating voltage generated by alternating current motor M1 into a direct current voltage based on a signal PWMC1.

Inverter 31 has a configuration similar to that of inverter 14. Inverter 31 converts the direct current voltage from capacitor C2 into an alternating voltage based on a signal PWMI2 from control device 30C to drive alternating current motor M2, and converts the alternating voltage generated by alternating current motor M2 into a direct current voltage based on a signal PWMC2. Current sensor 28 detects and provides to control device 30C a motor current MCRT2 flowing to each phase of alternating current motor M2.

Control device 30C receives direct current voltage Vb output from DC power supply B from voltage sensor 10, receives motor currents MCRT1 and MCRT2 from current sensors 24 and 28, respectively, receives output voltage Vm of voltage-up converter 12 (the input voltage to inverters 14 and 31) from voltage sensor 13 and receives torque control values TR1 and TR2 and motor rotation numbers MRN1 and MRN2 from the external ECU. Control device 30C generates and provides to inverter 14 signal PWMI1 required for switching control of NPN transistors Q3-Q8 of inverter 14 when inverter 14 drives alternating current motor M1 by the method set forth above, based on voltage Vb, output voltage Vm, motor current MCRT1, torque control value TR1 and motor rotation number MRN1.

Furthermore, control device 30C generates and provides to inverter 31 a signal PWMI2 required for switching control of NPN transistors Q3-Q8 of inverter 31 when inverter 31 drives alternating current motor M2 by the method set forth above, based on direct current voltage Vb, output voltage Vm, motor current MCRT2, torque control value TR2 and motor rotation number MRN2.

When inverter 14 or 31 drives alternating current motor M1 or M2, control device 30C generates and provides to voltage-up converter 12 a signal PWU required for switching control of NPN transistors Q1 and Q2 of voltage-up converter 12 by the method set forth above (any of the methods of the first to third embodiments), based on direct current voltage Vb, output voltage Vm, motor current MCRT1 (or MCRT2), torque control value TR1 (or TR2), and motor rotation number MRN1 (or MRN2).

Furthermore, control device 30C generates a signal PWMC1 required to convert the alternating voltage generated by alternating current motor M1 in the regenerative braking mode into the direct current voltage or a signal PWMC2 required to convert the alternating voltage generated by alternating current motor M2 in the regenerative braking mode into the direct current voltage to output the generated signal PWMC1 or PWMC2 to inverter 14 or inverter 31, respectively. In this case, control device 30C generates and provides to voltage-up converter 12 a signal PWD to control voltage-up converter 12 such that the direct current voltage from inverter 14 or 31 is down-converted to charge DC power supply B.

Control device 30C generates and provides to system relays SR1 and SR2 signal SE to turn on system relays SR1 and SR2.

Figure 21:
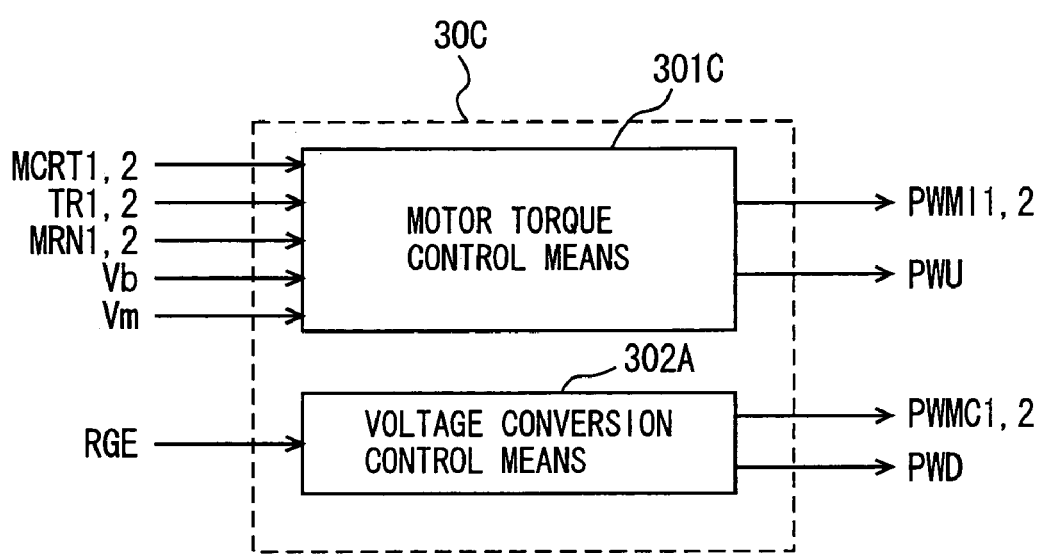
FIG. 21 is a functional block diagram of a control device in FIG. 19.

Referring to FIG. 21, control device 30C includes a motor torque control means 301C and voltage conversion control means 302A. Motor torque control means 301C generates and provides to inverters 14 and 31 signals PWMI1 and PWMI2, respectively, based on motor currents MCRT1 and 2, torque control values TR1 and 2, motor rotation numbers MRN1 and 2, direct current voltage Vb and output voltage Vm. Motor torque control means 301C generates and provides to voltage-up converter 12 a signal PWU based on direct current voltage Vb, output voltage Vm, motor current MCRT1 (or MCRT2), torque control value TR1 (or TR2), and motor rotation number MRN1 (or MRN2).

Upon receiving from the external ECU a signal RGE indicating that the hybrid vehicle or electric vehicle in which motor driver 100 is incorporated has entered the regenerative braking mode, voltage conversion control means 302A generates signals PWMC1 and PWMC2 and signal PWD to provide generated signals PWMC1 and PWMC2 to inverters 14 and 31, respectively, and signal PWD to voltage-up converter 12.

Figure 22:
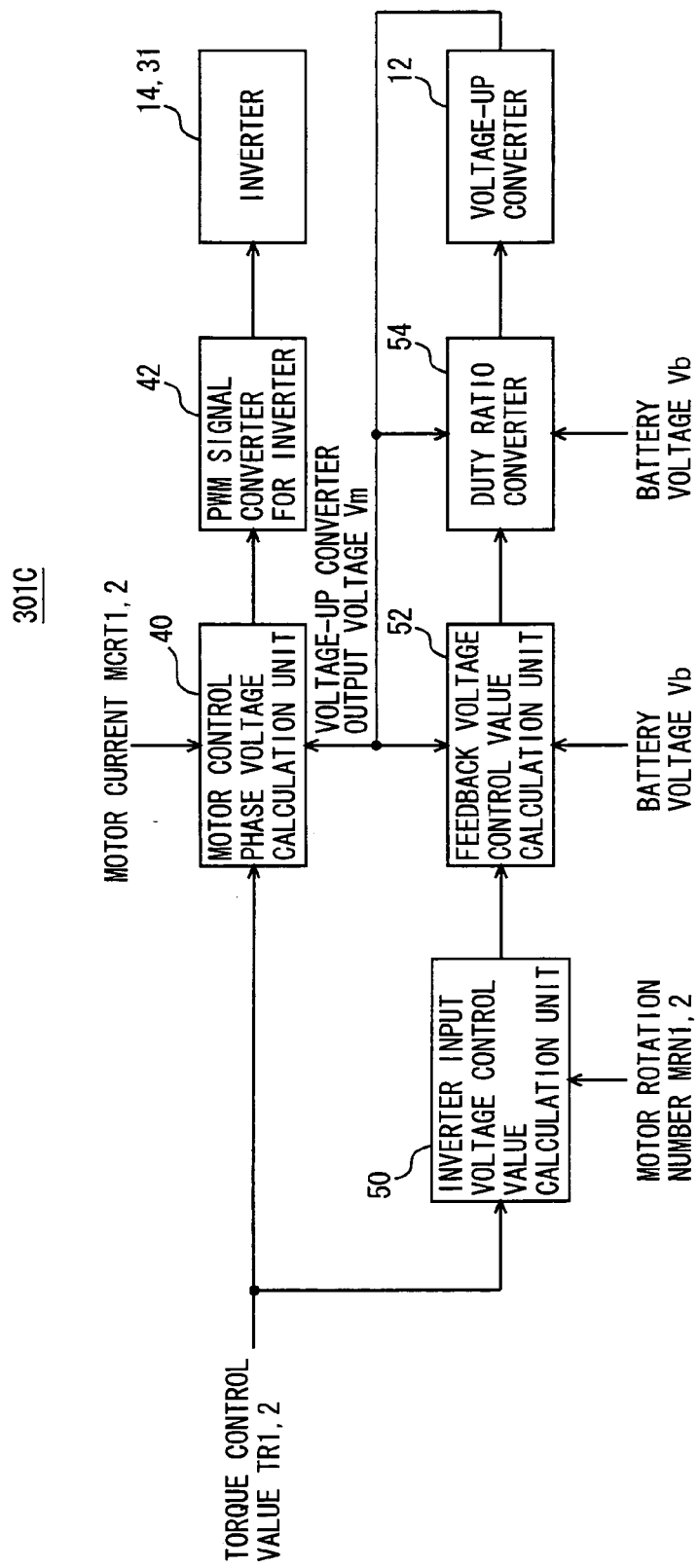
FIG. 22 is a functional block diagram to describe the function of a motor torque control means in FIG. 20.
Figure 23:
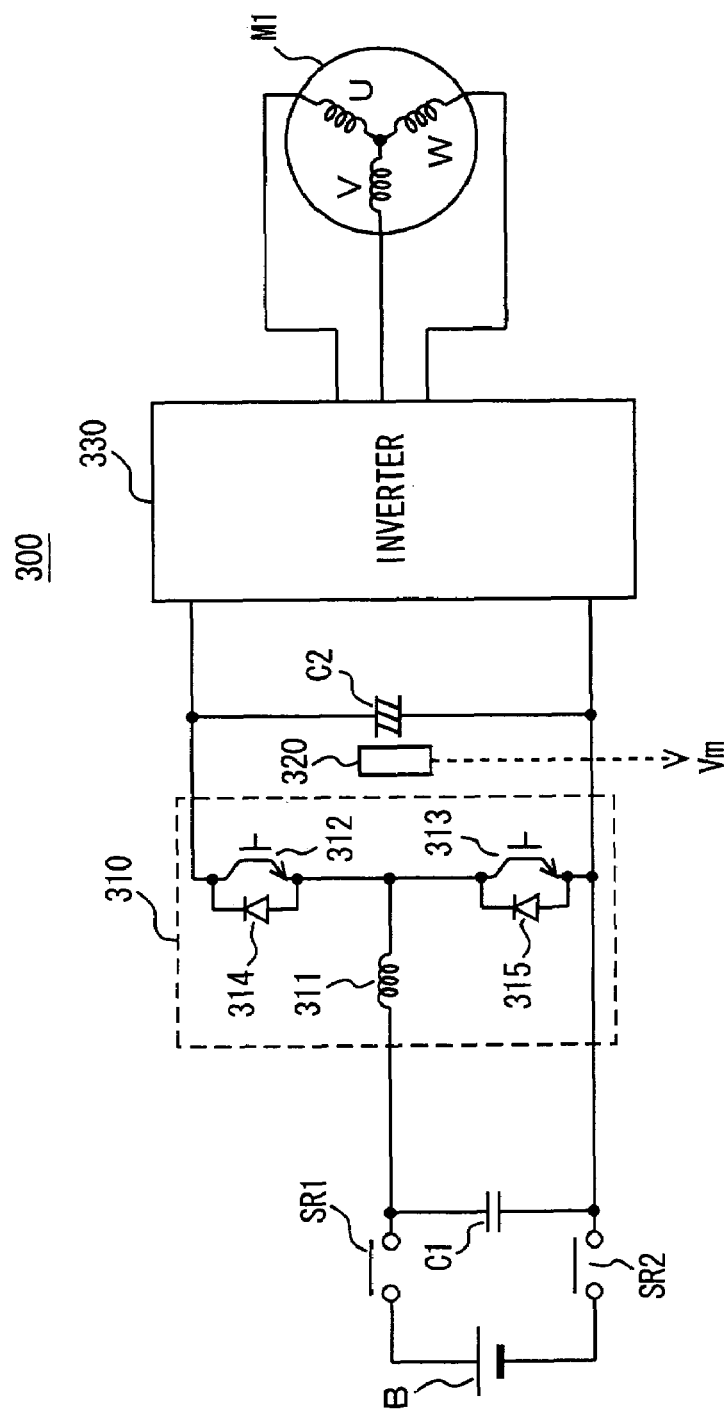
FIG. 23 is a schematic block diagram of a conventional motor driver.

Referring to FIG. 22, motor torque control means 301C has a configuration identical to that of motor torque control means 301 (refer to FIG. 3). It is to be noted that motor torque control means 301C differs from motor torque control means 301 in that motor torque control means 301 generates signals PWMI1, 2 and signal PWU based on two torque control values TR1, 2, two motor currents MCRT1, 2, and two motor rotation numbers MRN1, 2 to control inverters 14, 31, and voltage-up converter 12 based on the generated signals PWMI1, PWMI2, and PWU, respectively.

Motor control phase voltage calculation unit 40 calculates the voltage to be applied to each phase of alternating current motor M1 based on output voltage Vm from voltage-up converter 12, motor current MCRT1, and torque control value TR1, and calculates the voltage to be applied to each phase of alternating current motor M2 based on output voltage Vm, motor current MCRT2, and torque control value TR2. Motor control phase voltage calculation unit 40 provides the calculated voltage for alternating current motor M1 or M2 to PWM signal converter 42 for the inverter.

Upon receiving the voltage for alternating current motor M1 from motor control phase voltage calculation unit 40, inverter PWM signal converter 42 generates and provides to inverter 14 signal PWMI1 based on the received voltage. Upon receiving the voltage for alternating current motor M2 from motor control phase voltage calculation unit 40, inverter PWM signal converter 42 generates and provides to inverter 31 signal PWMI2 based on the received voltage.

Inverter input voltage control value calculation unit 50 calculates a voltage control value Vdccom based on torque control value TR1 and motor rotation number MRN1 (or torque control value TR1 and motor rotation number MRN2), and outputs the calculated voltage control value Vdccom to feedback voltage control value calculation unit 52.

As described in the first embodiment, based on voltage control value Vdccom, output voltage Vm and battery voltage Vb, feedback voltage control value calculation unit 52 calculates feedback voltage control value Vdccom_fb and compensation ratios Rcom, 1−Rcom where the follow-up property of output voltage Vm with respect to voltage control value Vdccom is equal to the reference property to provide the calculated feedback voltage control value Vdccom_fb and compensation ratios Rcom, 1−Rcom to duty ratio converter 54.

Duty ratio converter 54 generates and provides to voltage-up converter 12 a signal PWU (any of signals PWU0, PWU1, and PWU2) as described in the first embodiment.

Accordingly, the follow-up property of output voltage Vm with respect to voltage control value Vdccom is maintained at the reference property, even in the case where two alternating current motors M1 and M2 are connected, and direct current voltage Vb output from DC power supply B is converted into output voltage Vm.

In motor torque control means 301C, a feedback voltage control value calculation unit 52A may be applied instead of feedback voltage control value calculation unit 52.

Furthermore, in motor torque control means 301C, feedback voltage control value calculation unit 52B and duty ratio converter 54A may be applied instead of feedback voltage control value calculation unit 52 and duty ratio converter 54, respectively.

When feedback voltage control value calculation unit 52 and duty ratio converter 54 are applied to motor torque control means 301C, voltage conversion of direct current voltage Vb into output voltage Vm that maintains the follow-up property of output voltage Vm with respect to voltage control value Vdccom at the reference property is under control in accordance with the flow chart of FIG. 9.

When feedback voltage control value calculation unit 52A and duty ratio converter 54 are applied to motor torque control means 301C, voltage conversion of direct current voltage Vb into output voltage Vm that maintains the follow-up property of output voltage Vm with respect to voltage control value Vdccom at the reference property is under control in accordance with the flow chart of FIG. 14.

When feedback voltage control value calculation unit 52B and duty ratio converter 54A are applied to motor torque control means 301C, voltage conversion of direct current voltage Vb into output voltage Vm that maintains the follow-up property of output voltage Vm with respect to voltage control value Vdccom at the reference property is under control in accordance with the flow chart of FIG. 19.

In motor driver 100C, the number of motors to be driven is not limited two; three or more motors can be driven. For example, alternating current motor M1, alternating current motor M2, and the engine can be connected to a planetary gear mechanism (engine output shaft is connected to a carrier, alternating current motor M1 is connected to a sun gear, and alternating current motor M2 is connected to a ring gear), and the output shaft of the ring gear is configured such that the front wheel driving shaft, for example, of the vehicle is rotated, and the third alternating current motor can be arranged in the vehicle such that the rear wheel driving shaft is rotated. The present invention can be arranged appropriately in accordance with the various configurations of the electric vehicle and hybrid vehicle.

An entire operation of motor driver 100C will be described hereinafter with reference to FIG. 20 again. Description is provided based on control device 30C including feedback voltage control value calculation unit 52 and duty ratio calculation unit 54.

Upon initiation of the entire operation, control device 30C generates and provides to system relays SR1 and SR2 signal SE, whereby system relays SR1 and SR2 are turned on. DC power supply B provides the direct current voltage to voltage-up converter 12 via system relays SR1 and SR2.

Voltage sensor 10 detects direct current voltage Vb output from DC power supply B to provide the detected direct current voltage Vb to control device 30C. Voltage sensor 13 detects voltage Vm across capacitor C2 to provide the detected voltage Vm to control device 30C. Current sensor 24 detects and provides to control device 30C motor current MCRT1 flowing to alternating current motor M1. Current sensor 28 detects and provides to control device 30C motor current MCRT2 flowing to alternating current motor M2. Control device 30C receives torque control values TR1, 2 and motor rotation numbers MRN1, 2 from the external ECU.

In response, control device 30C generates and provides to inverter 14 signal PWMI1 by the method set forth above, based on direct current voltage Vb, output voltage Vm, motor current MCRT1, torque control value TR1 and motor rotation number MRN1. Control device 30C generates and provides to inverter 31 signal PWMI2 by the method set forth above based on direct current voltage Vb, output voltage Vm, motor current MCRT2, torque control value TR2 and motor rotation number MRN2.

Further, when inverter 14 (or 31) drives alternating current motor M1 (or M2), control device 30C generates and provides to voltage-up converter 12 signal PWU required for switching control of NPN transistors Q1 and Q2 of voltage-up converter 12 by the method set forth above (first embodiment), based on direct current voltage Vb, output voltage Vm, motor current MCRT1 (or MCRT2), torque control value TR1 (or TR2), and motor rotation number MRN1 (or MRN2).

Specifically, control device 30C calculates feedback voltage control value Vdccom_fb where the follow-up property of output voltage Vm with respect to voltage control value Vdccom is equal to the reference property, as well as compensation ratios Rcom, 1−Rcom, based on voltage control value Vdccom, output voltage Vm and battery voltage Vb to generate and provide to voltage-up converter 12 signal PWU (any of signals PWU0, PWU1 and PWU2) based on the calculated feedback voltage control value Vdccom_fb and compensation ratios Rcom, 1−Rcom.

Accordingly, voltage-up converter 12 boosts the direct current voltage from DC power supply B while maintaining the follow-up property of output voltage Vm with respect to voltage control value Vdccom at the reference property in accordance with signal PWU (any of signals PWU0, PWU1 and PWU2), and supplies the boosted direct current voltage to capacitor C2 via nodes N1 and N2. Inverter 14 converts the direct current voltage smoothed by capacitor C2 into the alternating voltage by signal PWMI1 from control device 30C to drive alternating current motor M1. Further, inverter 31 converts the direct current voltage smoothed by capacitor C2 into the alternating voltage by signal PWMI2 from control device 30C to drive alternating current motor M2. Accordingly, alternating current motor M1 generates the torque designated by torque control value TR1, whereas alternating current motor M2 generates the torque designated by torque control value TR2.

When the hybrid vehicle or electric vehicle in which motor driver 100C is incorporated is in the regenerative braking mode, control device 30C receives signal RGE from the external ECU to generate and provide to inverters 14 and 31 signals PWMC1, 2, respectively, in accordance with the received signal RGE, and to generate and provide to voltage-up converter 12 signal PWD.

Accordingly, inverter 14 converts the alternating voltage generated at alternating current motor M1 into the direct current voltage in accordance with signal PWMC1 to supply the converted direct current voltage to voltage-up converter 12 via capacitor C2. Further, inverter 31 converts the alternating voltage generated by alternating current motor M2 into the direct current voltage in accordance with signal PWMC2 to supply the converted direct current voltage to voltage-up converter 12 via capacitor C2. Voltage-up converter 12 receives the direct current from capacitor C2 via nodes N1 and N2 to down-convert the received direct current voltage by signal PWD, and supplies the down-converted direct current voltage to DC power supply B. Accordingly, DC power supply B is charged by the power generated by alternating current motor M1 or M2.

In the case where control device 30C includes feedback voltage control value calculation unit 52A and duty ratio calculation unit 54, the entire operation of motor driver 100C is similar to the above-described operation, provided that the boosting operation by voltage-up converter 12 is carried out in accordance with the flow chart of FIG. 14.

Further, in the case where control device 30C includes feedback voltage control value calculation unit 52B and duty ratio calculation unit 54A, the entire operation of motor driver 100C is similar to the above-described operation, provided that the boosting operation of voltage-up converter 12 is carried out in accordance with the flow chart of FIG. 19.

The remaining elements are similar to those of the first to third embodiments.

In accordance with the fourth embodiment, the voltage conversion apparatus includes control means for controlling the voltage-up converter such that the follow-up property of the output voltage to the voltage control value is equal to the reference property, under feedback control such that the output voltage that is a converted version of the direct current voltage from the DC power supply is equal to the voltage control value. Since the output voltage converted by the voltage conversion apparatus is provided to a plurality of invertors that drive a plurality of motors, the direct current voltage can be converted into the output voltage while keeping the follow-up property of the output voltage with respect to the voltage control value constant even in the case where a plurality of motors are connected.

Although the above description is based on a case where the present invention is applied to feedback control using proportional gain PG and integration gain IG, the present invention may be applied to feedback control using proportional gain PG, integration gain IG, and a derivative gain DG.

It will be understood that the embodiments disclosed herein are by way of illustration and example only, and is not to be taken by way of limitation. The scope of the present invention is defined by the appended claims rather than by the description of the embodiments set forth above. All changes that fall within the limits and bounds of the claims, or equivalence thereof are therefore intended to be embraced by the claims.

INDUSTRIAL APPLICABILITY

The present invention is applied to a voltage conversion apparatus converting the direct current voltage into the output voltage such that the follow-up property of the output voltage with respect to the designated voltage is constant.

The invention claimed is:

1. A voltage conversion apparatus converting a direct current voltage from a DC power supply into an output voltage such that the output voltage is equal to a designated voltage, comprising:
   a voltage converter altering a voltage level of the direct current voltage to provide the output voltage,
   a detection unit detecting the output voltage output from the voltage converter, and
   a control unit controlling the voltage converter based on the detected output voltage and the designated voltage, wherein a transient response property of the voltage converter with respect to the designated voltage in feedback control is consistent with a reference transient response property of the voltage converter when the voltage level of the direct current voltage is equal to a reference voltage at a first time, where the output voltage crosses the designated voltage after a first time period after the first time independent of the output voltage at the first time.

2. The voltage conversion apparatus according to claim 1, wherein
   said voltage converter includes a chopper circuit, said control unit comprises a feedback voltage control value calculation unit detecting a difference between said output voltage and said designated voltage to determine a control gain in said feedback control in accordance with the detected difference, and calculating a feedback voltage control value in said feedback control such that said transient response property is equal to said reference transient response property based on the determined control gain, said output voltage, and said difference, a duty ratio calculation unit calculating a switching duty ratio of said chopper circuit, based on said calculated feedback voltage control value, and a switching signal generation unit generating a switching signal having said switching duty ratio, and providing the generated switching signal to said chopper circuit.

3. The voltage conversion apparatus according to claim 2, wherein said feedback voltage control value calculation unit calculates said feedback voltage control value by correcting a feedback preliminary voltage control value calculated using said control gain such that said transient response property is equal to said reference transient response property.

4. The voltage conversion apparatus according to claim 3, wherein said feedback voltage control value calculation unit comprises a subtracter calculating a difference between said output voltage and said designated voltage, a gain determination unit determining said control gain based on said difference, a computing element calculating said feedback preliminary voltage control value based on said determined control gain, and a corrector correcting said feedback preliminary voltage control value by converting said output voltage into a reference voltage where said transient response property is equal to said reference transient response property to output said feedback voltage control value.

5. The voltage conversion apparatus according to claim 2, wherein said feedback voltage control value calculation unit calculates said feedback voltage control value by correcting said difference such that said transient response property is equal to said reference transient response property.

6. The voltage conversion apparatus according to claim 5, wherein said feedback voltage control value calculation unit comprises a subtracter calculating a difference between said output voltage and said designated voltage, a corrector correcting said difference such that said transient response property is equal to said reference transient response property, a gain determination unit determining said control gain based on said difference, and a computing element calculating said feedback voltage control value based on said determined control gain and said corrected difference.

7. The voltage conversion apparatus according to claim 6, wherein said corrector corrects said difference by converting said output voltage into a reference voltage where said transient response property is equal to said reference transient response property.

8. The voltage conversion apparatus according to claim 1, wherein said voltage converter includes of a chopper circuit, said control unit comprises a feedback voltage control value calculation unit detecting a difference between said output voltage and said designated voltage to determine a control gain in said feedback control in accordance with the detected difference, and calculating a feedback preliminary voltage control value in said feedback control based on the determined control gain, said output voltage, and said difference, a duty ratio calculation unit calculating a switching duty ratio of said chopper circuit such that said transient response property is equal to said reference transient response property, based on said calculated feedback preliminary voltage control value and said output voltage, and a switching signal generation unit generating a switching signal having said switching duty ratio, and providing the generated switching signal to said chopper circuit.

9. A voltage conversion apparatus converting a direct current voltage from a DC power supply into an output voltage such that the output voltage is equal to a designated voltage, comprising:

a voltage converter altering a voltage level of the direct current voltage to provide the output voltage, wherein the voltage converter includes a chopper circuit;

a detection unit detecting the output voltage output from the voltage converter; and a control unit controlling the voltage converter based on the detected output voltage and the designated voltage, where the control unit includes a feedback voltage control value calculation unit, a duty ratio calculation unit, and a switching signal generation unit, wherein a transient response property of the voltage converter with respect to the designated voltage in feedback control is equal to a reference transient response property of the voltage converter;

the feedback voltage control value calculation unit calculates a feedback voltage control value, the feedback voltage control value calculation unit including a subtracter calculating a difference between the output voltage and the designated voltage;

a gain determination unit determining, based on the difference between the output voltage and the designated voltage, a control gain in the feedback control;

a computing element calculating a feedback preliminary voltage control value based on the determined control gain; and a corrector calculating a ratio of a reference voltage to the output voltage, and calculating the feedback voltage control value by multiplying the feedback preliminary voltage control value by the calculated ratio;

the duty ratio calculation unit calculates, based on the calculated feedback voltage control value, a switching duty ratio of the chopper circuit; and the switching signal generation unit generates a switching signal having the switching duty ratio, and provides the generated switching signal to the chopper circuit.

10. A voltage conversion apparatus converting a direct current voltage from a DC power supply into an output voltage such that the output voltage is equal to a designated voltage, comprising:

a voltage converter altering a voltage level of the direct current voltage to provide the output voltage, wherein the voltage converter includes a chopper circuit;

a detection unit detecting the output voltage output from the voltage converter; and a control unit controlling the voltage converter based on the detected output voltage and the designated voltage, where the control unit includes a feedback voltage control value calculation unit, a duty ratio calculation unit, and a switching signal generation unit, wherein a transient response property of the voltage converter with respect to the designated voltage in feedback control is equal to a reference transient response property of the voltage converter;

the feedback voltage control value calculation unit calculates a feedback voltage control value, the feedback voltage control value calculation unit including a subtracter calculating a difference between the output voltage and the designated voltage;

a corrector calculating a ratio of a reference voltage to the output voltage and correcting the difference by multiplying the difference by the calculated ratio;

a gain determination unit determining a control gain in the feedback control based on the difference; and a computing element calculating the feedback voltage control value based on the determined control gain and the corrected difference;

the duty ratio calculation unit calculates, based on the calculated feedback voltage control value, a switching duty ratio of the chopper circuit; and the switching signal generation unit generates a switching signal having the switching duty ratio, and provides the generated switching signal to the chopper circuit.

11. A voltage conversion apparatus converting a direct current voltage from a DC power supply into an output voltage such that the output voltage is equal to a designated voltage, comprising:

a voltage converter altering a voltage level of the direct current voltage to provide the output voltage, wherein the voltage converter includes a chopper circuit;

a detection unit detecting the output voltage output from the voltage converter; and a control unit controlling the voltage converter based on the detected output voltage and the designated voltage, where the control unit includes a feedback voltage control value calculation unit, a duty ratio calculation unit, and a switching signal generation unit, wherein a transient response property of the voltage converter with respect to the designated voltage in feedback control is equal to a reference transient response property, and the output voltage is equal to the designated voltage;

the feedback voltage control value calculation unit detects a difference between the output voltage and the designated voltage to determine a control gain in the feedback control in accordance with the detected difference, and calculates a feedback preliminary voltage control value in the feedback control based on the determined control gain, the output voltage, and the difference;

the duty ratio calculation unit calculates, based on the calculated feedback preliminary voltage control value and the output voltage, a switching duty ratio of the chopper circuit by correcting a preliminary duty ratio calculated using the feedback preliminary voltage control value; and the switching signal generation unit generates a switching signal having the switching duty ratio, and provides the generated switching signal to the chopper circuit.

12. The voltage conversion apparatus according to claim 11, wherein said duty ratio calculation unit comprises a computing element calculating said preliminary duty ratio in accordance with said feedback preliminary voltage control value, and a corrector correcting said preliminary duty ratio such that said transient response property is equal to said reference transient response property.

13. The voltage conversion apparatus according to claim 12, wherein said corrector corrects said preliminary duty ratio by converting said output voltage into a reference voltage where said transient response property is equal to said reference transient response property.

14. The voltage conversion apparatus according to claim 13, wherein said corrector calculates a ratio of said reference voltage to said output voltage, and corrects said preliminary duty ratio by multiplying the calculated result by said preliminary duty ratio.

15. A voltage conversion method of converting a direct current voltage from a DC power supply into an output voltage under feedback control such that the output voltage is equal to a designated voltage, the method comprising:

a first step of detecting the output voltage, a second step of detecting a difference between the designated voltage and the output voltage, a third step of determining a control gain in accordance with the detected difference, and a fourth step of converting the direct current voltage, based on the determined control gain, the detected difference, and the detected output voltage, into the output voltage, wherein a transient response property of the output voltage with respect to the designated voltage in the feedback control is consistent with a reference transient response property of the output voltage when the voltage level of the direct current voltage is equal to a reference voltage at a first time, where the output voltage crosses the designated voltage after a first time period after the first time independent of the output voltage at the first time.

16. The voltage conversion method according to claim 15, wherein said direct current voltage being converted into said output voltage by a chopper circuit, said fourth step comprises a first substep of calculating a feedback voltage control value that causes said transient response property to match said reference transient response property in said feedback control, based on said control gain, said difference, and said output voltage, a second substep of calculating a switching duty ratio of said chopper circuit using said feedback voltage control value, and a third substep of controlling said chopper circuit such that said output voltage is equal to said designated voltage, based on said switching duty ratio.

17. The voltage conversion method according to claim 16, wherein said first substep includes the step of calculating a feedback preliminary voltage control value in said feedback control based on said control gain and said difference, and the step of calculating said feedback voltage control value by correcting said feedback preliminary voltage control value using said output voltage.

18. The voltage conversion method according to claim 16, wherein said first substep includes the step of calculating a correction difference where said transient response property is equal to said reference transient response property by correcting said difference using said output voltage, and the step of calculating said feedback voltage control value based on said control gain and said correction difference.

19. A voltage conversion method of converting a direct current voltage from a DC power supply into an output voltage under feedback control such that the output voltage is equal to a designated voltage, the method comprising:
detecting the output voltage;
detecting a difference between the designated voltage and the output voltage;
determining a control gain in accordance with the detected difference; and
converting, using a chopper circuit, the direct current voltage into the output voltage based on the determined control gain, the detected difference, and the detected output voltage, wherein a transient response property of the output voltage with respect to the designated voltage in the feedback control is equal to a reference transient response property, and wherein the step of converting further includes
a first substep of calculating a feedback preliminary voltage control value in the feedback control based on the determined control gain and the difference;
a second substep of calculating a conversion ratio required to convert the output voltage into a reference voltage, and multiplying the feedback preliminary voltage control value by the conversion ratio to calculate the feedback voltage control value that causes the transient response property to match the reference transient response property in the feedback control;
a third substep of calculating, based on the calculated feedback voltage control value, a switching duty ratio of the chopper circuit; and
a fourth substep of controlling the chopper circuit based on the switching duty ratio, wherein the output voltage outputted by the chopper is equal to the designated voltage.

20. A voltage conversion method of converting a direct current voltage from a DC power supply into an output voltage under feedback control such that the output voltage is equal to a designated voltage, the method comprising:
detecting the output voltage;
detecting a difference between the designated voltage and the output voltage;
determining a control gain in accordance with the detected difference; and
converting, using a chopper circuit, the direct current voltage into the output voltage based on the determined control gain, the detected difference, and the detected output voltage, wherein a transient response property of the output voltage with respect to the designated voltage in the feedback control is equal to a reference transient response property, and wherein the step of converting further includes
a first substep of calculating a conversion ratio required to convert the output voltage into a reference voltage where the transient response property is equal to the reference transient response property;
a second substep of multiplying the detected difference by the conversion ratio to calculate a correction difference;
a third substep of calculating a feedback voltage control value based on the control gain and the correction difference;
a fourth substep of calculating, based on the calculated feedback voltage control value, a switching duty ratio of the chopper circuit; and
a fifth substep of controlling the chopper circuit based on the switching duty ratio, wherein the output voltage outputted by the chopper circuit is equal to the designated voltage.

21. A voltage conversion method of converting a direct current voltage from a DC power supply into an output voltage under feedback control such that the output voltage is equal to a designated voltage, the method comprising:
a first step of detecting the output voltage;
a second step of detecting a difference between the designated voltage and the output voltage;
a third step of determining a control gain in accordance with the detected difference; and
a fourth step of converting, using a chopper circuit, the direct current voltage into the output voltage based on the determined control gain, the detected difference, and the detected output voltage, wherein a transient response property of the output voltage with respect to the designated voltage in the feedback control is equal to a reference transient response property, and wherein the fourth step further includes
a first substep of calculating a feedback preliminary voltage control value in the feedback control based on the determined control gain and the detected difference;
a second substep of calculating a preliminary switching duty ratio of the chopper circuit based on the feedback preliminary voltage control value;
a third substep of correcting the preliminary switching duty ratio using the output voltage to calculate a switching duty ratio where the transient response property is equal to the reference transient response property; and
a fourth substep of controlling the chopper circuit based on the switching duty ratio, wherein the output voltage outputted by the chopper circuit is equal to the designated voltage.

22. The voltage converison method according to claim 21, wherein said third substep includes
the step of calculating a conversion ratio required to convert said output voltage into a reference voltage where said transient response property is equal to said reference transient response property, and
the step of multiplying said preliminary switching duty ratio by said conversion ratio to calculate said switching duty ratio.

23. A computer-readable recording medium with a program recorded thereon to allow a computer to execute control of voltage conversion of converting a direct current voltage from a DC power supply into an output voltage under feedback control such that the output voltage is equal to a designated voltage, the computer executing:
a first step of detecting the output voltage,
a second step of detecting a difference between the designated voltage and the output voltage,
a third step of determining a control gain in accordance with the detected difference, and
a fourth step of converting the direct current voltage, based on the determined control gain, the detected difference, and the detected output voltage, into the output voltage, wherein a transient response property of the output voltage with respect to the designated voltage in the feedback control is consistent with a reference transient response property of the output voltage when the voltage level of the direct current voltage is equal to a reference voltage at a first time, where the output voltage crosses the designated voltage after a first time period after the first time independent of the output voltage at the first time.

24. The computer-readable recording medium recorded with a program thereon to be executed by a computer according to claim 23, wherein
said direct current voltage being converted into said output voltage by a chopper circuit,
said fourth step comprises
a first substep of calculating a feedback voltage control value that causes said transient response property to match said reference transient response property in said feedback control, based on said control gain, said difference, and said output voltage,
a second substep of calculating a switching duty ratio of said chopper circuit using said feedback voltage control value, and
a third substep of controlling said chopper circuit such that said output voltage is equal to said designated voltage, based on said switching duty ratio.

25. The computer-readable recording medium recorded with a program thereon to be executed by a computer according to claim 24, wherein said first substep includes
the step of calculating a feedback preliminary voltage control value in said feedback control based on said control gain and said difference, and
the step of calculating said feedback voltage control value by correcting said feedback preliminary voltage control value using said output voltage.

26. The computer-readable recording medium recorded with a program thereon to be executed by a computer according to claim 24, wherein said first substep includes
the step of calculating a correction difference where said transient response property is equal to said reference transient response property by correcting said difference using said output voltage, and
the step of calculating said feedback voltage control value based on said control gain and said correction difference.

27. A computer-readable recording medium with a program recorded thereon to allow a computer to execute control of voltage conversion of converting a direct current voltage from a DC power supply into an output voltage under feedback control such that the output voltage is equal to a designated voltage, the computer executing:
detecting the output voltage;
detecting a difference between the designated voltage and the output voltage;
determining a control gain in accordance with the detected difference; and
converting, using a chopper circuit, the direct current voltage into the output voltage based on the determined control gain, the detected difference, and the detected output voltage, wherein a transient response property of the output voltage with respect to the designated voltage in the feedback control is equal to a reference transient response property, and wherein the step of converting further includes
a first substep of calculating a feedback preliminary voltage control value in the feedback control based on the determined control gain and the difference;
a second substep of calculating a conversion ratio required to convert the output voltage into a reference voltage, and multiplying the feedback preliminary voltage control value by the conversion ratio to calculate the feedback voltage control value that causes the transient response property to match the reference transient response property in the feedback control;
a third substep of calculating, based on the calculated feedback voltage control value, a switching duty ratio of the chopper circuit; and
a fourth substep of controlling the chopper circuit based on the switching duty ratio, wherein the output voltage outputted by the chopper is equal to the designated voltage.

28. A computer-readable recording medium with a program recorded thereon to allow a computer to execute control of voltage conversion of converting a direct current voltage from a DC power supply into an output voltage under feedback control such that the output voltage is equal to a designated voltage, the computer executing:
detecting the output voltage;
detecting a difference between the designated voltage and the output voltage;
determining a control gain in accordance with the detected difference; and
converting, using a chopper circuit, the direct current voltage into the output voltage based on the determined control gain, the detected difference, and the detected output voltage, wherein a transient response property of the output voltage with respect to the designated voltage in the feedback control is equal to a reference transient response property, and wherein the step of converting further includes
a first substep of calculating a conversion ratio required to convert the output voltage into a reference voltage where the transient response property is equal to the reference transient response property;
a second substep of multiplying the detected difference by the conversion ratio to calculate a correction difference;
a third substep of calculating a feedback voltage control value based on the control gain and the correction difference;
a fourth substep of calculating, based on the calculated feedback voltage control value, a switching duty ratio of the chopper circuit; and
a fifth substep of controlling the chopper circuit based on the switching duty ratio, wherein the output voltage outputted by the chopper circuit is equal to the designated voltage.

29. A computer-readable recording medium with a program recorded thereon to allow a computer to execute control of voltage conversion of converting a direct current voltage from a DC power supply into an output voltage under feedback control such that the output voltage is equal to a designated voltage, the computer executing:
a first step of detecting the output voltage;
a second step of detecting a difference between the designated voltage and the output voltage;
a third step of determining a control gain in accordance with the detected difference; and
a fourth step of converting, using a chopper circuit, the direct current voltage into the output voltage based on the determined control gain, the detected difference, and the detected output voltage, wherein a transient response property of the output voltage with respect to the designated voltage in the feedback control is equal to a reference transient response property, and wherein the fourth step further includes
- a first substep of calculating a feedback preliminary voltage control value in the feedback control based on the determined control gain and the detected difference;
- a second substep of calculating a preliminary switching duty ratio of the chopper circuit based on the feedback preliminary voltage control value;
- a third substep of correcting the preliminary switching duty ratio using the output voltage to calculate a switching duty ratio where the transient response property is equal to the reference transient response property; and
- a fourth substep of controlling the chopper circuit based on the switching duty ratio, wherein the output voltage outputted by the chopper circuit is equal to the designated voltage.

30. The computer-readable recording medium recorded with a program thereon to be executed by a computer according to claim 29, wherein said third substep includes
- the step of calculating a conversion ratio required to convert said output voltage into a reference voltage where said transient response property is equal to said reference transient response property, and
- the step of multiplying said preliminary switching duty ratio by said conversion ratio to calculate said switching duty ratio.

* * * * *

UNITED STATES PATENT AND TRADEMARK OFFICE
CERTIFICATE OF CORRECTION

PATENT NO. : 7,262,978 B2
APPLICATION NO. : 10/523145
DATED : August 28, 2007
INVENTOR(S) : Kenji Yamada It is certified that error appears in the above-identified patent and that said Letters Patent is hereby corrected as shown below:

Title Page, Please change (87) PCT Publication No. from "WO2004017906" to --WO2004017506--.

Signed and Sealed this

Eighteenth Day of March, 2008

JON W. DUDAS
*Director of the United States Patent and Trademark Office*